United States Patent
Barrad et al.

(10) Patent No.: US 12,488,263 B2
(45) Date of Patent: Dec. 2, 2025

(54) METHODS AND APPARATUS FOR TIME-SERIES FORECASTING USING DEEP LEARNING MODELS OF A DEEP BELIEF NETWORK WITH QUANTUM COMPUTING

(71) Applicant: Ernst & Young LLP, Toronto (CA)

(72) Inventors: Sherif Barrad, Ile-Bizard (CA); Ricardo A. Collado, Melrose, MA (US); Biren Agnihotri, Ontario (CA); Olumide Akinola, North York (CA)

(73) Assignee: Ernst & Young LLP, Toronto (CA)

( * ) Notice: Subject to any disclaimer, the term of this patent is extended or adjusted under 35 U.S.C. 154(b) by 0 days.

(21) Appl. No.: 18/300,707

(22) Filed: Apr. 14, 2023

(65) Prior Publication Data

US 2024/0403671 A1    Dec. 5, 2024

(51) Int. Cl.
*G06N 7/01* (2023.01)
*G06N 3/08* (2023.01)
(Continued)

(52) U.S. Cl.
CPC .......... *G06N 7/01* (2023.01); *G06N 3/08* (2013.01); *G06N 3/084* (2013.01); *G06N 3/088* (2013.01);
(Continued)

(58) Field of Classification Search
CPC  G06N 7/01; G06N 3/08; G06N 3/084; G06N 3/088; G06N 5/01; G06N 20/20; G06N 20/00
See application file for complete search history.

(56) References Cited

U.S. PATENT DOCUMENTS

2015/0317558 A1 *  11/2015  Adachi .................... G06N 3/04
                                                        706/19
2017/0177993 A1 *  6/2017  Draelos .................. G06N 3/045
(Continued)

FOREIGN PATENT DOCUMENTS

WO    WO-2024211994 A1    10/2024

OTHER PUBLICATIONS

Adachi, Steven H., and Maxwell P. Henderson. "Application of quantum annealing to training of deep neural networks." arXiv preprint arXiv:1510.06356 (2015). (Year: 2015).*
(Continued)

*Primary Examiner* — Michael J Huntley
*Assistant Examiner* — Sehwan Kim
(74) *Attorney, Agent, or Firm* — COOLEY LLP

(57) ABSTRACT

An apparatus including a Deep Belief Network is configured to receive, via a processor, input data. The processor is caused to initialize, based on the input data, weights for a learning model of the DBN. The processor is further caused to generate, via the learning model, a representation of the input data. The weights, the input data, and the representation is to be transmitted to a quantum compute device. The processor is caused to receive sampled values from the quantum compute device using an optimization function associated with the quantum compute device. The processor is further caused to update, based on the sampled values, the weights to train the learning model to produce a trained learning model. The trained learning model is configured to generate an updated representation of the input data. The processor is further caused to generate, via a regression layer, output data based on the updated representation.

20 Claims, 7 Drawing Sheets

(51) Int. Cl.
*G06N 3/084* (2023.01)
*G06N 3/088* (2023.01)
*G06N 5/01* (2023.01)
*G06N 20/00* (2019.01)
*G06N 20/20* (2019.01)

(52) U.S. Cl.
CPC .............. *G06N 5/01* (2023.01); *G06N 20/20* (2019.01); *G06N 20/00* (2019.01)

(56) References Cited

U.S. PATENT DOCUMENTS

| | | |
|---|---|---|
| 2017/0364796 A1 | 12/2017 | Wiebe et al. |
| 2018/0217585 A1* | 8/2018 | Giering ................ G06V 10/454 |
| 2019/0243735 A1 | 8/2019 | He et al. |
| 2020/0210876 A1 | 7/2020 | Rolfe et al. |
| 2020/0401916 A1 | 12/2020 | Rolfe et al. |
| 2023/0094389 A1 | 3/2023 | You et al. |
| 2023/0186126 A1* | 6/2023 | Hassan .................. G01N 15/08 706/25 |
| 2023/0244935 A1* | 8/2023 | Letourneau ............ G06N 3/048 706/16 |
| 2024/0160986 A1* | 5/2024 | Kordzanganeh ....... G06N 10/40 |
| 2024/0289620 A1* | 8/2024 | Makariou .............. G06N 3/047 |
| 2024/0311670 A1* | 9/2024 | Senokosov ............ G06V 10/82 |

OTHER PUBLICATIONS

Li, Hongru, et al. "Fault prognosis of hydraulic pump based on bispectrum entropy and deep belief network." Measurement science review 19.5 (2019): 195-203. (Year: 2019).*

Caldeira, Joao, et al. "Restricted boltzmann machines for galaxy morphology classification with a quantum annealer." arXiv preprint arXiv:1911.06259 (2019). (Year: 2019).*

Kuremoto, Takashi, et al. "Time series forecasting using a deep belief network with restricted Boltzmann machines." Neurocomputing 137 (2014): 47-56. (Year: 2014).*

Hinton, Geoffrey E., Simon Osindero, and Yee-Whye Teh. "A fast learning algorithm for deep belief nets." Neural computation 18.7 (2006): 1527-1554. (Year: 2006).*

Manukian, Haik, Fabio L. Traversa, and Massimiliano Di Ventra. "Accelerating deep learning with memcomputing." Neural Networks 110 (2019): 1-7. (Year: 2019).*

Xu, Xiaojing, Srinjoy Das, and Ken Kreutz-Delgado. "ApproxDBN: Approximate computing for discriminative deep belief networks." arXiv preprint arXiv:1704.03993 (2017). (Year: 2017).*

Pilati, S., and P. Pieri. "Simulating disordered quantum Ising chains via dense and sparse restricted Boltzmann machines." Physical Review E 101.6 (2020): 063308. (Year: 2020).*

Alaql, Omar, and Cheng-Chang Lu. "No. reference image quality metric based on multiple deep belief networks." IET Image Processing 13.8 (2019): 1321-1327. (Year: 2019).*

Lecun, Yann, et al. "Efficient backprop." Neural networks: Tricks of the trade. Berlin, Heidelberg: Springer Berlin Heidelberg, 2002. 9-50. (Year: 2002).*

Bingham, Garrett, William Macke, and Risto Miikkulainen. "Evolutionary optimization of deep learning activation functions." Proceedings of the 2020 Genetic and Evolutionary Computation Conference. 2020. (Year: 2020).*

Hayou, Soufiane, Arnaud Doucet, and Judith Rousseau. "On the selection of initialization and activation function for deep neural networks." arXiv preprint arXiv:1805.08266 (2018). (Year: 2018).*

Adachi, Steven H. et al., "Application of quantum annealing to training of deep neural networks," arXiv preprint arXiv:1510.06356, Oct. 21, 2015, 18 pages.

Dixit et al., "Training restricted boltzmann machines with a d-wave quantum annealer," Frontiers in Physics, Jun. 29, 2021, vol. 9, Article No. 589626, 10 pages.

Gao, Pan, et al. "Quantum gradient algorithm for general polynomials," Physical Review A, Apr. 1, 2021, vol. 103, Iss. 4, 9 pages.

Gao, Pan, et al., "Quantum second-order optimization algorithm for general polynomials," Science China Physics, Mechanics & Astronomy, 2021, vol. 64, Art. No. 100311, e12, pp. 1-10.

Hrasko et al., "Time series prediction using restricted boltzmann machines and backpropagation," Procedia Computer Science, 2015, vol. 55, pp. 990-999.

Hu, Feng, et al., "Quantum machine learning with D-wave quantum computer," Quantum Engineering, Jun. 2019, vol. 1. Issue 2 e12.

Kuremoto et al., "Time series forecasting using a deep belief network with restricted Boltzmann machines," Neurocomputing, 2014, vol. 137, pp. 47-56.

Nguyen, Nga TT et al., "Image classification using quantum inference on the d-wave 2x," 2018 IEEE International Conference on Rebooting Computing (ICRC), IEEE, Nov. 7, 2018, pp. 1-7.

Rojo, Javier, et al., "Trials and tribulations of developing hybrid quantum-classical microservices systems," arXiv preprint arXiv:2105.04421, May 10, 2021, 11 pages.

Zhang, Yao et al., "Recent advances in quantum machine learning," Quantum Engineering, Mar. 2, 2020, vol. 2, Issue 1, e34.

International Search Report and Written Opinion for PCT Application No. PCT/CA2024/050462, mailed Jul. 22, 2024, 12 pages.

Lara-Benítez, P. et al., "An Experimental Review on Deep Learning Architectures for Time Series Forecasting," arXiv:2103.12057v2 [cs.LG], Apr. 8, 2021. Retrieved from https://arxiv.org/abs/2103.12057; 25 pages.

Oreshkin, B. N. et al., "N-BEATS: Neural basis expansion analysis for interpretable time series forecasting," arXiv:1905.10437v4 [cs.LG], Feb. 20, 2020. Retrieved from https://arxiv.org/abs/1905.10437; 31 pages.

Patent Trial and Appeal Board Decision for U.S. Appl. No. 16/591,239, mailed Feb. 13, 2025; 15 pages.

Riemer, M. et al., "Correcting Forecasts with Multifactor Neural Attention," Proceedings of The 33rd International Conference on Machine Learning, PMLR, Jun. 19, 2016, vol. 48, pp. 3010-3019.

\* cited by examiner

METHODS AND APPARATUS FOR TIME-SERIES FORECASTING USING DEEP LEARNING MODELS OF A DEEP BELIEF NETWORK WITH QUANTUM COMPUTING

FIELD

The present disclosure generally relates to the field of forecasting using quantum computing. In particular, the present disclosure is related to methods and apparatus for time-series forecasting using deep learning models of a Deep Belief Network with quantum computing.

BACKGROUND

Time-series forecasting is a process that can predict future outcomes or data to improve decision-making for a variety of key performance indicators (KPIs) in a variety businesses such as, for example, finance, supply chain, marketing, operations, and/or the like. Time-series forecasting is heavily integrated in today's business landscape, resulting in potential wide-ranging effects on a variety of industries. Time-series forecasting, however, can be challenging due to the inherent complexity and non-linear nature of data.

Additionally, some solutions to the challenges of time-series forecasting emphasize categorization over regression methods or run on platforms that do not have the computing power to deliver results quickly. A need exists to enable machine learning and deep learning algorithms to interpret complex data and generate results accurately and efficiently.

SUMMARY

In one or more embodiments, an apparatus includes a processor and a memory operatively coupled to the processor. The memory stores instructions to cause the processor to receive input data for a Deep Belief Network (DBN). The instructions further cause the processor to randomly initialize, based on the input data, a set of weights for a deep learning model from a set of deep learning models associated with the DBN. The instructions further cause the processor to generate, via the deep learning model and based on the input data and a subset of weights from the set of weights, a representation of the input data. The subset of weights, the input data, and the representation is to be transmitted to a quantum compute device. The instructions further cause the processor to receive a set of sampled values from the quantum compute device using an optimization function associated with the quantum compute device. The set of sampled values is generated based on the subset of weights, the input data, and the representation of the input data. The instructions further cause the processor to update, based on the set of sampled values, the subset of weights to train the deep learning model to produce a trained deep learning model. The trained deep learning model is configured to generate an updated representation of the input data. The memory stores instruction to further cause the processor to generate, via a regression layer associated with the DBN, output data based on the updated representation of the input data.

In one or more embodiments, a non-transitory, processor-readable medium stores instructions that when executed by a processor, cause the processor to receive, from a compute device, a first subset of weights from a set of weights and a first set of inputs that are associated with a first deep learning model from a set of deep learning models of a Deep Belief Network (DBN). The processor is further caused to convert, based the first set of inputs, a first optimization function associated with each deep learning model from the set of deep learning models of the DBN to a second optimization function. The processor is further caused to encode the first set of inputs to generate first encoded data. The processor is further caused to generate, using the second optimization function, first sampled data based on the first subset of weights and the first encoded data. The first sampled data is used to update a set of parameters of the first optimization function. The set of parameters of the first optimization function is used to reduce a first error value associated with the first deep learning model. The processor is further caused to receive, from the compute device, a second subset of weights from a plurality of weights and a second set of inputs that are associated with a second deep learning model from the set of deep learning models. The processor is further caused to map the second set of inputs to a set of parameters of the second optimization function to produce a set of second input mappings. The processor is further caused to generate, using the second optimization function, second sampled data based on the second subset of weights and the set of second input mappings. The second sampled data is used to update the set of parameters of the first optimization function. The set of parameters of the first optimization function is used to reduce a second error value associated with the second deep learning model, the second error value being less than the first error value.

In one or more embodiments, a non-transitory, processor-readable medium stores instructions that when executed by a processor, cause the processor to receive input data for a Deep Belief Network (DBN). The processor is further caused to randomly initialize, based on the input data, a set of weights for each deep learning model from a set of deep learning models associated with the DBN. The processor is further caused to iteratively perform, until an error value associated with the DBN is below a predetermined threshold, receiving, from a quantum compute device using an optimization function associated with the quantum compute device, a set of sampled values. The set of sampled values is generated based on at least a subset of weights from the set of weights and associated with a deep learning model from the set of deep learning models. The processor is further caused to iteratively perform updating, based on the set of sampled values, the subset of weights. The processor is further caused to iteratively perform training the deep learning model based on the updated subset of weights, to produce a trained deep learning model. The trained deep learning model is configured to generate an updated representation of the input data. The processor is further caused to iteratively perform generating, via a regression layer associated with the DBN, output data based on the updated representation of the input data. The processor is further caused to iteratively perform iteratively updating, via back-propagation of the regression layer, a set of weights of the regression layer to reduce the error value. The processor is further caused to iteratively perform reconstructing, via the deep learning model, the representation of the input data based on the subset of weights updated by the regression layer, to produce a reconstructed representation of the input data.

DETAILED DESCRIPTION

Figure 1:
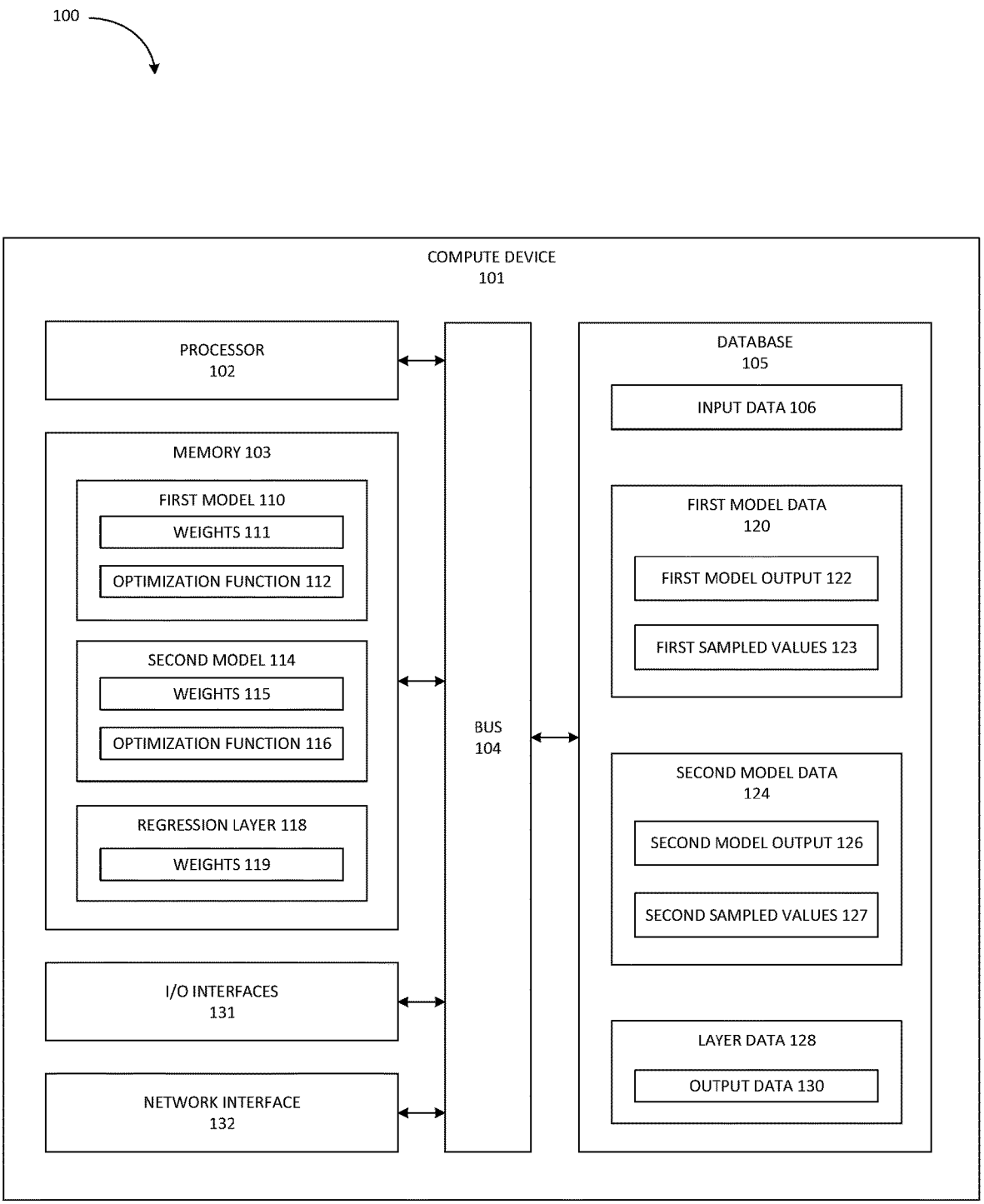
FIG. 1 is an illustration of a system including a classical computer with machine learning models of a Deep Belief Network using quantum computing techniques for time-series forecasting, according to one or more embodiments.

In one or more embodiments, an apparatus includes a compute device configured to implement a deep learning architecture for time-series forecasting. In some implementations, the compute device can be a classical compute device such that the deep learning architecture can include one or more machine learning models such as, for example, a supervised machine learning model, an unsupervised machine learning model, a tree-based model, a deep neural network model (DNN), an artificial neural network (ANN) model, a fully connected neural network, a convolutional neural network (CNN), a residual network model, a feature pyramid network (FPN) model, a generative adversarial network (GAN), a K-Nearest Neighbors (KNN) model, a Support Vector Machine (SVM), a decision tree, a random forest, an analysis of variation (ANOVA), boosting, a Naïve Bayes classifier, and/or the like. In some instances, the machine learning model can include a deep learning model. The deep learning model can also be or include a Restricted Boltzmann Machines (RBM), a supervised deep learning model, an unsupervised deep learning model, an autoregressive integrated moving average (ARIMA) model, and/or the like. The deep learning models of the deep learning architecture can be trained on historical data such as, for example, company data, current events, social media, news, weather, economic data, and/or the like, to make predictions about future values in various industries such as, for example, supply chain, retail, finance, operations, marketing, and/or the like. In some implementations, the apparatus can take into account various factors that can influence the historical data such as trends, seasonal trends, and/or cyclical patterns. In some implementations, the apparatus can implement an algorithm for time-series forecasting that leverages laws of quantum physics and probabilities to compute the algorithm to make predictions quickly and accurately compared to using algorithms that leverage primarily (or exclusively) classical computing methods. In some implementations, the apparatus can evaluate the accuracy of the predictions from the deep learning models using metrics such as, for example, mean absolute error (MAE), mean squared error (MSE), root mean squared error (RMSE), Weighted Mean Absolute Percentage Error (WMAPE), Forecast Accuracy, and/or the like. This is so, at least in part, to set predetermined error thresholds to evaluate the predictions.

For instance, the apparatus can be configured to deliver an accurate forecast for supply chain industries to procure correct quantity of materials, schedule optimal production runs, manage inventory, define transport and logistics requirements, and/or the like. In another example, the apparatus can be configured to deliver an accurate forecast for financial industries by predicting, for example, credit and market risk, cash flows, procurement needs, operating expense, profit margins, and/or the like. In another example, the apparatus can be configured to deliver an accurate forecast in management operation fields by predicting, for example, labor utilization, employee turnover rate, employee absence rate, operating margins, and/or the like. In another example, the apparatus can be configured to deliver an accurate forecast in marketing industries by predicting, for example, cost per lead, new customers, conversion rates, order valuer, revenue by product or service, and/or the like. The apparatus can optimize a tool for decision-making in many industries, predict future demand for products or services, optimize resource allocation, and inform strategic planning.

In one or more embodiments, an apparatus can be configured to provide computational power beyond that of classical computers. The apparatus can, for example, implement an algorithm for quantum tunneling to improve training of deep learning models from a classical computer for time-series forecasting. This is so, at least in part, to increase speed and accuracy of predictions over classical computing methods. For example, the apparatus can store client data that includes between 100,000 to 1,000,000 stock keeping units (SKUs) and each SKU can be modeled against a set of common and unique variables, potentially representing 100,000,000,000,000,000,000,000 or $10^{23}$ calculations. For instance, the apparatus can model millions of SKUs against, for example, 23 different variables of influence (e.g., price, seasonality, marketing, economic factors, demographics, competition, promotions, etc.). In other words, the apparatus can leverage quantum computing with classical computing to produce the calculations without running out of memory. The apparatus can be configured to accelerate speed and precision of forecasting results and produce those forecasting results within a fraction of the time using classical computing methods. In some implementations, the apparatus can leverage both machine learning algorithms and quantum computation by framing forecasting problems as an Ising Hamiltonian problem. This is so, at least in part, to interpret data of various formats such as, for example, binary variables. For instance, the apparatus can implement adiabatic quantum computing (AQC) by initializing variables for deep learning models in a known ground state, and then slowly evolved into a final Hamiltonian that encodes forecasting problems to computational problems. For instance, the apparatus can iteratively provide updates to parameters of deep learning models to make the outputs of those deep learning models more closely match a desired distribution. In some cases, a forecasting problem can also refer to herein the task of predicting values, events, trends, and/or the like.

In some implementations, the apparatus can implement a deep learning architecture that includes a Deep Belief Network with Restricted Boltzmann Machines (DBN-RBMs). The DBN-RBMs can be trained for time-series forecasting to capture complex temporal patterns in data and make accurate predictions of future values. The DBN-RBMs can also capture complex patterns and dependencies in the data, even when the data are nonlinear and high-dimensional. The apparatus can stack multiple RBMs in the DBN such that the DBN-RBMs can learn a hierarchical representation of the time-series data. A first RBM can be at the lowest level and configured to capture short-term patterns in the data, while following RBMs at higher levels can capture longer-term patterns. Predicted outputs from the last or highest level RBM can be fed into a separate regression layer, which maps the predicted outputs to a continuous output value. During training, the DBN-RBMs can be trained to minimize the prediction error between the predicted values and the actual values in the training set. Once the DBN-RBMs are trained, the DBN-RBMs can be used to make predictions of future values based on the learned patterns in the data. In other words, an RBM can learn a compact representation of the input data in the hidden layer of that RBM such that the hidden layer can be used as a feature detector that can extract important features of the input data. This is so, at least in part, to dimensionally reduce the input data for various forecasting problems and/or tasks.

In some implementations, the apparatus can combine techniques from deep learning and generative stochastic neural networks with adiabatic quantum computing to solve continuous regression problems. In some implementations, the apparatus can implement a process to solve continuous regression problems by formulating a problem of forecasting continuous values as a particular type of regression. The process can include applying generative training techniques mixed with adiabatic quantum computation to approximate an initial solution to the problem. This is so, at least in part, to exploit quantum tunneling and produce approximations faster than with standard methods. The process can further include discriminative training (e.g., backpropagation) to fine tune previous approximations. In some cases, the training process can be iteratively performed in a stochastic gradient descent on random batches of data. In other words, weights of the RBMs can be updated in a direction of a negative gradient with a random step size. In some implementations, some data can be too large so the data can be divided into separate batches (epochs).

In some implementations, the apparatus including a classical compute device can include multiple deep learning models such as RBMs. For instance, an RBM can be or include a generative neural network model that has two layers of neurons, visible units and hidden units. In some cases, the units from the visible units and the hidden units can also be referred to herein as "nodes". The visible units represent input data, while the hidden units learn to extract features from the input data. Initially, no connections exist between the visible units or between the hidden units. At the beginning of a training phase parameters of the RBM, such as, for example, biases, weights, optimization functions, activation functions, etc., can be randomly initialized to establish connections between the visible units and the hidden units, connections between visible units, and/or connections between hidden units. The RBM can include a visible layer that includes input data, each representing a feature or attribute of the input data (e.g., news, events, weather, sales, reports, etc.). In some cases, the values of the visible units are usually binary or continuous. The RBM can also include a hidden layer that includes a set of hidden units that are not directly connected to each other or to the visible units. In some cases, the values of the hidden units can be (typically) binary. The RBM can also include components such as, for example, weights, biases, optimization functions, activation functions, and/or the like. The weights can define a strength of multiple connections between the visible units and hidden units. In some cases, a weight matrix is initialized randomly and is updated during training using a learning algorithm such as a learning algorithm compatible with a quantum compute device to sample gradient components of the RBM. The biases can be scalar values associated with each visible unit and hidden unit. In some cases, the scalar values can be singular numerical values that represent a quantity (e.g., integers, floating-point numbers, and/or any other numeric data type) that have magnitudes but without direction. The energy function can be used to measure the compatibility between the visible units and the hidden units. The optimization function can also be defined by the weights and biases of the RBM. The activation functions can be used to model non-linear relationships between the visible units and the hidden units. The RBM can also include activation probabilities that can be used to indicate activation of hidden units from visible units. In some implementations, the classical compute device can also include a second RBM such that the visible units of the second RBM are the hidden units of the prior RBM. In some implementations, the classical compute device can also include a regression layer configured to fine-tune parameters of the regression layer (e.g., weights, biases, learning rate, etc.) in a supervised training setting (e.g., backpropagation). This is so, at least in part, to fine-tune parameters updated (or sampled) via a quantum compute device. The regression layer can be represented as:

$$\frac{1}{2S}\sum_{i=1}^{S}\sum_{j=1}^{R}\left(\sum_{k=1}^{Q}\hat{x}_{ijk}G_{ij} - y_{ij}\right)^2$$

where $\hat{x}_{ijk}$ is a predicted output at a preceding RBM hidden layer, G is a binary-to-real number linear transformation that maps a binary output of a preceding hidden layer of an RBM to a continuous real-valued input for a current hidden layer of an RBM, S is a sequence length, R is the number of samples, and $y_{ij}$ are observed sequence samples.

In some embodiments, a classical compute device and a quantum compute device can work together to solve time-series forecasting problems quickly and accurately. For instance, the classical compute device can implement a deep learning architecture with multiple RBMs that have parameters that can be optimized using various optimization functions (also referred to herein as "objective functions," "energy functions," "loss functions," etc.). For instance, the optimization function can include an energy function:

$$E(v,h) = -b^T v - c^T h - h^T W v$$

where v represents visible units, h represents hidden units, b represents biases for the visible units, h represents biases for the hidden units, c represents a vector of bias terms for hidden units h, and W represents the mixing weights of an RBM. In some cases, the energy function (or cost function) can be a function that assigns an energy value to a particular configuration of variables of the RBM. The energy function can defined by the weights and biases of the RBM.

In some instance, the optimization function can include an energy joint probability:

$$P(v, h) = \frac{1}{Z}e^{-E(v,h)}$$

where Z is an intractable partition function. The energy joint probability can be proportional to the exponential of a negative energy function.

In some instance, the optimization function can include energy conditional probabilities:

$$P(h_j = 1|v) = \sigma\left(c_j + \sum_i W_{ij}v_i\right), \text{ and}$$

-continued $$P(v_i = 1|h) = \sigma\left(b_i + \sum_j W_{ij} h_j\right)$$

where σ is a logistic function. In some cases, the energy conditional probabilities of the visible units given the hidden units and vice versa can be defined by the energy function.

In some instance, the optimization function can include a log-likelihood energy function:

$$l(W, b, c) = \sum_{t=1}^{N} \log \sum_h e^{-E(v^{(t)}, h)} - N \cdot \log \sum_{v,h} e^{-E(v,h)}$$

Where N is the number of training samples. In some cases, the log-likelihood of input data given the parameters of the RBM can be proportional to the negative of the energy function. In other words, the log-likelihood energy function can be used to measure a level of fit of a statistical model to a set of observed data.

In some instance, the optimization function can include a log-likelihood gradient:

$$\nabla_\theta l(\theta) = \sum_{t=1}^{N} \langle \nabla_\theta (-E(v^{(t)}, h)) \rangle_{P(h|v^{(t)})} - N \cdot \langle \nabla_\theta (-E(v, h)) \rangle_{P(v,h)}$$

where θ={W, b, c} is a full set of parameters, and $\langle \bullet \rangle_{P(v,h)}$ is the expectation value with respect to the joint P(v, h). In some cases, the gradient of the log-likelihood with respect to the parameters of the RBM can be used to update the weights and biases of the RBM during training. In some cases, the log-likelihood gradient, as opposed to the log-likelihood energy function, can be used to compute a gradient of the log-likelihood energy function for the parameters of the RBM, which can be used to iteratively update the parameters in optimization algorithms such as, for example, gradient descent.

In some instance, the optimization function can include log-likelihood partial derivatives:

$$\nabla_w l = \frac{1}{N} \sum_{t=1}^{N} \langle v^{(t)} \cdot h^{(t)} \rangle_{P(h|v^{(t)})} - \langle v \cdot h \rangle_{P(v,h)}$$

$$\nabla_b l = \frac{1}{N} \sum_{t=1}^{N} \langle v^{(t)} \rangle_{P(h|v^{(t)})} - \langle v \rangle_{P(v,h)}$$

$$\nabla_c l = \frac{1}{N} \sum_{t=1}^{N} \langle h^{(t)} \rangle_{P(h|v^{(t)})} - \langle h \rangle_{P(v,h)}$$

The partial derivatives of the log-likelihood with respect to the weights and biases of the RBM can be computed during training.

In some implementations, the quantum compute device can include quantum annealing hardware (e.g., D-Wave®) to run an annealing process. The annealing process can include, for example, the quantum compute device to be initialized at a simple state and gradually evolved towards a low-energy state of an optimization function (e.g., Ising Hamiltonian). In some implementations, the quantum annealing hardware can also run a reverse annealing process. On the other hand, the reverse annealing process can include the quantum compute device starting at the low-energy state of the problem Hamiltonian and then evolve (or devolve) back towards the simple and/or initial state. For instance, input data can be encoded using an Ising Hamiltonian formulation to binary variables, which can be mapped onto qubits of the quantum compute device (e.g., quantum annealer). In other words, the apparatus can implement an algorithm to solve a regression of a DBN by sampling the RBMs of the DBN-RBM directly on a quantum annealer. The DBNs without a regression layer can be represented as a quadratic unconstrained binary optimization (QUBO) formulation (or Ising Hamiltonian representation) that is embedded in a computational graph of the quantum annealer. The binary variables can represent the spins of a magnetic system, and interactions between the binary variables can be represented by couplings between the qubits in the quantum compute device. In some implementations, the quantum compute device can initiate a annealing process by starting at a low temperature (i.e., Boltzmann distribution which governs a probability of finding the quantum compute device in a particular state). The quantum annealing process can include gradually decreasing the temperature by fixing a final state of the quantum compute device to a higher value. This is so, at least in part, to explore a range of low-energy states and generate samples from the Boltzmann distribution of the Ising Hamiltonian formulation. For instance the Ising Hamiltonian formulation can be:

$$H_{Ising}(s) = -\frac{A(s)}{2}\left(\sum_i \hat{\sigma}_x^i\right) + \frac{B(s)}{2}\left(\sum_i h_i \hat{\sigma}_z^i + \sum_{(i>j)} J_{ij} \hat{\sigma}_z^i \hat{\sigma}_z^j\right)$$

where $\hat{\sigma}_x^i$ are Pauli matrices operating on the $i^{th}$ qubit. $h_i$ and $J_{ij}$ are corresponding qubit biases and coupling strengths. $s \in [0,1]$ can be the anneal fraction and A(s) and B(s) can be anneal functions. In some cases, the quantum compute device can schedule the setup of A and B. In some implementations, at the end of a reverse annealing process (i.e., quantum compute device reaches its lowest energy state), the final Ising Hamiltonian formulation:

$$H_F = \sum_i h_i \hat{\sigma}_z^i + \sum_{(i>j)} J_{ij} \hat{\sigma}_z^i \hat{\sigma}_z^j$$

can be obtained by a Deep Belief Network (DBN), and embedded into a computational graph of the quantum compute device.

The quantum compute device can be configured to transform optimization function so the RBMs of the classical compute device to the Ising Hamiltonian formulation can be solved using quantum annealing techniques. The Ising Hamiltonian formulation (final Ising Hamiltonian) can be formulated as a QUBO formulation with a quadratic polynomial of binary variables. The QUBO formulation can then be mapped onto the qubits and couplers of the quantum compute device. This is so, at least in part, to represent optimization functions that can be solved via quantum computing techniques. The QUBO formulation can be:

$$\min\left(\sum_i a_i x_i + \sum_i \sum_{j>i} b_{i,j} x_i x_j + c\right)$$

where $x_i$ and $x_j$ are binary, and $a_i$, $b_i$, c are coefficients obtained from a particular optimization function to be formulated. In some cases, QUBO formulations can be used to map optimization functions to the Ising Hamiltonian formulation, which can then be solved using quantum computing techniques (e.g., quantum annealing). In some implementations, the QUBO formulation can be represented as matrices, where the elements of the matrix correspond to the coefficients of the quadratic terms and the linear terms in the objective function. In some implementations, the quantum compute device can be configured to use the QUBO formulation to generate sampled values to be applied to inputs of parameters of the optimization function for the RBMs FIG. 1 is an illustration of a system 100 including a classical computer with machine learning models of a Deep Belief Network using quantum computing techniques for time-series forecasting using classical computing, according to one or more embodiments. The system 100 can include a compute device 101 such as, for example, a classical compute device. The compute device 101 can include, for example, a processor 102, input/output (I/O) interfaces 131, a network interface 132, a database 105, and a memory 103 that communicate with each other, and with other components, via a bus 104. The bus 104 can include any of several types of bus structures such as, for example, a memory bus, a memory controller, a peripheral bus, a local bus, and/or the like, using any of a variety of bus architectures. The compute device 101 can be or include, for example, a computer workstation, a terminal computer, a server computer, a handheld device (e.g., a tablet computer, a smartphone, etc.), and/or any machine capable of executing a sequence of instructions that specify an action to be taken by that machine, and any combinations thereof. The compute device 101 can also include multiple compute devices that can be used to implement a specially configured set of instructions for causing one or more of the compute devices to perform any one or more of the aspects and/or methodologies described herein.

The I/O interfaces 131 can be or include hardware and software components that allow other compute devices and other electronic devices to communicate with the compute device 101 by sending and receiving data. The network interface 132 can be used for connecting the compute device 101 to one or more of a variety of networks (not shown in FIG. 1) and one or more remote devices connected thereto. In network interface 132 can be used to connect the compute device 101 to a quantum compute device described in FIG. 2. In other words, although not shown in FIG. 1, the various devices including computer device 101 can communicate with other devices via a network(s). For instance, a network can include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network can be a wireless network such as, for example, a Wi-Fi or wireless local area network ("WLAN"), a wireless wide area network ("WWAN"), and/or a cellular network. In other instances, the network can be a wired network such as, for example, an Ethernet network, a digital subscription line ("DSL") network, a broadband network, and/or a fiber-optic network. In some instances, the compute device 101 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted or unencrypted. In some instances, the network can include multiple networks or subnetworks operatively coupled to one another by, for example, network bridges, routers, switches, gateways and/or the like.

The database 105 can be, for example, a data storage system that stores a collection of data that is organized and stored in a structured manner. The database 105 can be accessed via the processor 102 to retrieve, modify, and/or manage data. In some cases, the database 105 can include a cloud database, a local database, a relational database, a hierarchical database, a network database, a time-series database, and/or the like. In some cases, the database 105 can also include a data management system. In some implementations, the database 105 can store any data received, generated, and/or modified by the processor 102 and/or any components of the compute device 101 and/or an external source. In some implementations, the memory 103 can be used to store temporary data and/or data being processed in real time. For instance, the memory 103 can store components of the DBN (e.g., first model 110, second model 114, regression layer 118, etc.) to execute the components using the input data 106 and/or any data involved executing the components. In some implementations, the database 105 can store data used for training the components of the DBN. For instance, the database 105 can store historical data from multiple sources that can be used for training the components of the DBN. This is so, at least in part, so the database 105 can store a collection of data generated from multiple executions of the components of the DBN in an organized and/or structured manner to form training sets for further training of the components of the DBN. In some cases, the memory 103 and the database 105 can store the same data and/or transfer data from one to the other.

For instance, the database 105 can store input data 106, first model data 120 associated with a first model 110, second model data 124 associated with a second model 114, layer data 128, and/or the like. The input data 106 can include historical data associated with, for example, sales, weather, market, financial, and/or the like. For instance, the input data 106 can include a collection of data describing SKUs (e.g., number of SKUs sold over a period of time), closing prices of stocks, economic indicators, temperature measurements and patterns, daily energy consumption and usage rates, internet traffic, and/or the like.

The first model data 120 can store data associated with the first model 110 such as, for example, a first model output 122, a set of first sampled values 123, and/or the like. The first model output 122 can be or include data generated by the first model 110. In other words, the first model output 122 can be or include hidden units of the first model 110. The first sampled values 123 can be or include values generated by a quantum compute device (not shown in FIG. 1) that are used to be inputted into parameters of the first model 110. For instance, the first sample values 123 can include updated weights (or new weights) used to replace a set of weights 111 (or subset of weights 111) of the first model 110. The first sampled values 123 can also include updated biases (or new biases) for the first model 110. In some implementations, the full sampled values 123 can be used to reduce an error value associated with the first model 110.

The second model data 124 can store data associated with the second model 114 such as, for example, a model output 126, a set of second sampled values 127, and/or the like. The model output 126 can be or include data generated by the second model 114. In other words, the model output 126 can be or include hidden units of the second model 114. The second sampled values 127 can be or include values generated by the quantum compute device that are input into parameters of the second model 114. For instance, the second sample values 127 can include updated weights (or new weights) used to replace the weights 115 (or subset of the weights 115) of the second model 114. The second sampled values 127 can also include updated biases (or new biases) for the second model 114.

The layer data 128 can include data associated with the regression layer 118. For instance, the layer data 128 can include data received and/or generated by the regression layer 118 such as, for example, output data 130. The output data 130 can represent a continuous value representing a prediction of the DBN-RBNs.

The processor 102 can be or include, for example, a hardware-based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 103 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 102 to perform one or more processes, functions, and/or the like. In some implementations, the memory 103 can include extendable storage units that can be added and used incrementally. In some implementations, the memory 103 can be a portable memory (e.g., a flash drive, a portable hard disk, and/or the like) that can be operatively coupled to the processor 102. In some instances, the memory 103 can be remotely operatively coupled with a separate compute device (not shown in FIG. 1). The memory 103 can include various components (e.g., machine-readable media) including, but not limited to, a random-access memory component, a read only component, and any combinations thereof. In one example, a basic input/output system (BIOS), including basic routines that help to transfer information between components within the compute system 101, such as during start-up, can be stored in memory 103. The memory 103 can further include any number of program modules including, for example, an operating system, one or more application programs, other program modules, program data, and any combinations thereof.

In some implementations, the memory 103 can store at least a first model 110, a second model 114, a regression layer 118, and/or the like. Each of the first model 110 and the second model 114 can be or include, for example, a deep learning model, a neural network, a supervised machine learning model, an unsupervised machine learning model, an autoregressive integrated moving average (ARIMA) model, an exponential smoothing models, a tree model, and/or the like. The deep learning model can be or include, for example, a Restricted Boltzmann Machine (RBM), a supervised deep learning model, an unsupervised deep learning model, and/or the like, The regression layer 118 can be or include, for example, a linear regression layer, a support vector regression layer, a neural network with a single output unit, and/or the like. The first model 110 can include visible units, hidden units, and a set of weights 111 used to minimize an optimization function 121 associated with the first model 110. The optimization function 112 can be configured to measure how well the first model 110 can reconstruct the input data 106 (or visible units), which can be used to evaluate predicted values (or hidden units) of the first model 110. The weights 111 can be adjusted such that the first model 110 can capture complex relationships between the visible units and the hidden units and make more accurate predictions. The second model 114 can include a set of weights 115 used to minimize an optimization function 116 associated with the second model 114. The optimization function 116 can be configured to measure how well the second model 114 can reconstruct its input, which is the output of the first model 110 to produce a reconstruction of that input (e.g., second model output 126), which can also represent hidden units of the second model 114. The optimization function 116 can be used to evaluate predicted values (or hidden units) of the second model 114. The weights 115 can be adjusted such that the second model 114 can capture complex relationships between the visible units and the hidden units of the second model 114 and make more accurate predictions. The regression layer 118 can include a set of weights 119 used to map an input, such as an output of the second model 114 (e.g., second model output 126) to an output (e.g., output data 130). The regression layer 118 can be trained to optimize the mapping of the input to the output to make better predictions.

The memory 103 can store learning models (e.g., first model 110 and second model 114) and the regression layer 118 having a deep learning architecture. In some implementations, the memory 103 can include a Deep Belief Network with Restricted Boltzmann Machines (DBN-RBMs) in which the DBN includes multiple DBNs such as, for example, the first model 110 and the second model 114, and the regression layer 118. In some implementations, the memory 103 can store instructions to cause the processor 102 to randomly initialize, based on the input data 106, a set of weights (e.g., weights 111, 125) of the DBN-RBMs. For instance, the processor 102 can be caused to randomly initialize a subset of weights (e.g., weights 111) associated with the first model 110. Each weight from the set of weights 111 can represent a strength between visible units of the first model 110 and hidden units of the first model 110. The input data 106 can correspond to the visible units of the first model 110. The visible units of the first model 110 can be connected to other visible units and/or the hidden units via the weights 111. In some implementations, the weights 111 can be represented as a matrix of values in which one row of the matrix is associated with each visible unit of the first model 121 and one column of the matrix is associate with each hidden unit of the first model 121. In a training phase of the first model 110, the first model can learn new weights (or update the weights 111) based on sampled values from a quantum compute device (not shown in FIG. 1) to best capture patterns in the input data 106 (or the visible units). In some implementations, the input data 106 can be received from other compute devices connected via a network. In some cases, the input data 106 can be received from external sources such as, for example, social media, new feeds, public database, and/or the like.

The memory 103 can store instructions to cause the processor 102 to generate, via the first model 110 and based on the input data 131 and the subset of weights (e.g., weights 111) associated with the first model 110, a first model output 122 that includes a representation of the input data 106. The representation of the input data 106 can also be referred to as the hidden units of the first model 110. The representation of the input data 106 can represent a compressed and/or higher-level representation of the input data 106. In other words, the first model 110 can learn to represent the input data 106 using a smaller number of hidden units than that of the visible units. This is so, at least in part to capture more salient features of the input data 106 and reduce dimensionality of a forecasting problem (e.g., task of predicting values). In some implementations, the representation of the input data 106 can also include binary data. In some instances, the hidden units can represent, for example, seasonal patterns in sales (e.g., increased sales during holiday season), economic indicators (e.g., unemployment or interest rates), future impacts of marketing strategies (e.g., paid advertising, campaigns, social media promotion, etc.), impact of competitor activities (e.g., competitor sales, pricing, new products, etc.), and/or the like.

In some implementations, the memory 103 can store instructions to cause the processor 102 to generate, for the representation of the input data 106 (the output of the first model can also be referred as first model output 122) and/or the first model 110, a set of activation indicators based on the input data 106 and the subset of weights (e.g. weights 111) associated with the first model 110. The activation indicators can indicate an activation state for the representation of the input data 106 (e.g., hidden units of the first model 110) with respect to the input data 106. The activation indicators can be calculated based on an activation function. In some implementations, the activation function can be used to map non-linear relationships between the visible units (e.g., input data 106) and the hidden units of the first model 110 (e.g. first model output 122). The activation indicators can also be referred to herein as "activation probabilities", which can indicate activation of hidden units from the visible units. In some implementations, the memory 103 can store instructions to cause the processor 102 to generate, an optimization function such as, for example, log-likelihood gradient and/or log-likelihood partial derivatives, a set of gradients based on the activation indicators. The set of gradients can be used to train the first model 110. For instance, the gradients of the first model 110 can provide information about the energy state of the first model 110 as parameters (e.g., weights 111, biases, etc.) are adjusted. The gradients can be used to train the first model 110 to minimize a negative log-likelihood of the visible units of the first model 110 (e.g., input data 106). In other words, by iteratively adjusting the parameters of the first model 110 in the direction of decreasing the energy state of the first model 110, the first model 110 can learn to accurately model the visible units to the hidden units.

In some implementations, the memory 103 can store instructions to cause the processor 102 to transmit the first model output 122, the weights 111, and/or the input data 106 to the quantum compute device (not shown in FIG. 1). This is so, at least in part for the compute device 101 to receive updated parameters (e.g., weights, biases, etc.) for the first model 110 more quickly, efficiently, and/or accurately, than compared to updating the using classical computing methods. In other words, the quantum compute device can solve optimization problems (or optimization formulations 119) associated with the first model 110 by finding optimal weights and biases for the first model 110 that minimize the optimization function 112 (e.g., energy function) of the first model 110. The quantum compute device can serve to accelerate the finding of optimal weights and biases by using quantum annealing (or reverse annealing) and/or other quantum algorithms.

The memory 103 can store instructions to cause the processor 102 to receive the first sampled values 123 from the quantum compute device using an optimization function associated with the quantum compute device. The first sampled values 123 can be generated based on the weights 111, the input data 106, and the representation of the input data 106 (e.g., first model output 122). The optimization function associated with the quantum compute device can be a QUBO formulation. For instance, the optimization function 112 can be or include an Ising Hamiltonian function. The Ising Hamiltonian function can be mapped, converted to, and/or expressed as a QUBO formulation to attempt to find binary variables that minimize an energy state of the first model 110. In other words, the optimization formulation associated with the quantum compute device is used to solve optimization problems of the first model 110 and/or the DBN-RBMs using quantum computing techniques (e.g., quantum annealing or reverse annealing) to achieve faster and/or more efficient optimizations compared to classical computing methods.

The memory 103 can store instructions to cause the processor 102 to update, based on the first sampled values 123 and the weights 111 to train the first model 110 to produce a trained first model 110. After training, the first model 110 can be the trained first model. The memory 103 can store instructions to cause the processor 102 to execute the first model 110 to generate an updated representation of the input data 106. In other words, first model 110 can be trained to learn a probability distribution over the input data 106 (e.g., visible units of the first model 110) by adjusting the biases and/or weights between the visible and hidden units. Additionally, the first model 110 can be trained to maximize the likelihood of the data that the first model 110 is being trained with. In some implementations, the memory 103 can store instructions to cause the processor 102 to update the weights 111 of the first model 110 for a predetermined amount of iterations. In some cases, the memory 103 can store instructions to cause the processor 102 to train the first model 110 for the predetermined amount of iterations.

For instance, the memory 103 can store instructions to cause the processor 102 to train the first model using training data that includes unlabeled data. The unlabeled data can include data that corresponds to a vector of values for the visible units of the first model 110. The first model 110 can be trained to learn a compressed representation of the input data 106. During training of the first model 110, the first model 110 can learn weights of connections between the visible units and the hidden units that best capture the training data. In some implementations, training the first model 110 can include adjusting the weights 111 (and biases) of the first model 110 to minimize the optimization function 112 (e.g., cost function) that measures a difference between the input data 106 and the reconstruction of the input data 106 (e.g., first model output 122) produced by the first model 110.

The first model 110 can include a set of model parameters such as weights, biases, or activation functions that can be executed to annotate and/or classify input data (e.g., historical data). The first model 110 can be executed during a training phase and/or an execution phase. In the training phase, the first model 110 receives training data and optimizes (or improves) the set of model parameters of the first model 110. The set of model parameters are optimized (or improved) such that unlabeled input data in the training data for the first model 110 can be annotated and/or classified correctly with a certain likelihood of correctness (e.g., a pre-set likelihood of correctness). In some instances, the training data for the first model 110 can be divided into batches of data (e.g., epochs) based on a memory size, a memory type, a processor type, and/or the like. In some instances, the input data for the first model 110 can be divided into batches of data based on a type of the processor 102 (e.g., CPU, GPU, and/or the like), number of cores of the processor 102, and/or other characteristic of the memory 103 or the processor 102.

In some instances, the training data for the first model 110 can be divided into a training set, a test set, and/or a validation set. For example, the training data can be randomly divided so that 60% of the training data is in the training set, 20% of the training data is in the test set, and 20% of the training data is in the validation set. The first model 110 can be iteratively optimized (or improved) based on the training set while being tested on the test set to avoid overfitting and/or underfitting of the training set. Once the first model 110 is trained based on the training set and the test set, a performance of the first model 110 can be further verified based on the validation set.

In the execution phase of the first model 110, the first model 110 (that was trained in the training phase) receives input data (input data not used in the training phase (e.g., input data 106) and annotates and/or classifies input data to learn parameters of the first model 110 (e.g., weights 111, biases, etc.). Because the execution phase of the first model 110 is performed using the parameters of the first model 110 that were already optimized during the training phase, the execution phase of the first model 110 can be computationally quick.

The memory 103 can store instructions to cause the processor 102, using an updated representation of the input data 106 (e.g., first model output 122) as an input, to generate, via the second model 114 and based on a subset of weights of the DBN (e.g., weights 115), a second model output 126 that includes a representation of the input of the second model 114 (e.g., first model output 122). The second model output 126 of the second model 114 can also be referred to as the hidden units of the second model 114. The second model output 126 can represent a compressed and/or higher-level representation of the first model output 122 from the first model 110. In other words, the second model 114 can learn to represent the first model output 122 of the first model 110 using a smaller number of hidden units than that of the visible units. This is so, at least in part to capture more salient features of the first model output 122 of the first model 110 and reduce dimensionality of forecasting problem (e.g., predicting values). In some implementations, the second model output 126 can also include binary data. In some instances, the hidden units can represent, for example, seasonal patterns in sales (e.g., increased sales during holiday season), economic indicators (e.g., unemployment or interest rates), future impacts of marketing strategies (e.g., paid advertising, campaigns, social media promotion, etc.), impact of competitor activities (e.g., competitor sales, pricing, new products, etc.), and/or the like.

In some implementations, the memory 103 can store instructions to cause the processor 102 to generate, for the second model output 126 and/or the second model 114, a set of activation indicators based on the first model output 122 and the subset of weights (e.g. weights 115) associated with the second model 114. The activation indicators can indicate an activation state for the representation of the first model output 122 (e.g., hidden units of the second model 114) with respect to the first model output 122. The activation indicators can be calculated based on an activation function. The activation function can be used to map non-linear relationships between the visible units and the hidden units of the second model 114 (also referred to herein as the second model output 126). In some implementations, the memory 103 can store instructions to cause the processor 102 to generate, using an optimization function 116 such as, for example, log-likelihood gradient and/or log-likelihood partial derivatives, a set of gradients based on the activation indicators. The set of gradients can be used to train the second model 114. For instance, the gradients of the second model 114 can provide information about the energy state of the second model 114 and how the parameters (e.g., weights 115, biases, etc.) can be further adjusted. The gradients can be used to train the second model 114 to minimize a negative log-likelihood of the visible units of the second model 114 (e.g., first model output 122). In other words, by iteratively adjusting the parameters of the second model 114 in the direction of decreasing the energy state of the second model 114, the second model 114 can learn to accurately model the visible units to the hidden units.

In some implementations, the memory 103 can store instructions to cause the processor 102 to transmit the second model output 126, the weights 115, and/or the first model output 122 to the quantum compute device. This is so, at least in part for the compute device 101 to receive updated parameters (e.g., weights, biases, etc.) for the second model 114 more quickly, efficiently, and/or accurately, than compared to updating the parameters using classical computing methods. In other words, the quantum compute device can solve optimization problems (e.g., optimization function 112 and/or optimization function 116) associated with the second model 114 (and the first model 110) by finding optimal weights and biases for the second model 114 that minimize the optimization function 116 (e.g., energy function) of the second model 114. The quantum compute device can serve to accelerate the finding of optimal weights and biases by using quantum annealing (or reverse annealing) and/or other quantum algorithms.

The memory 103 can store instructions to cause the processor 102 to receive the second sampled values 127 from the quantum compute device using the optimization function associated with the quantum compute device. The second sampled values 127 can be generated based on the weights 115 (and/or other variables of the second model 114), the first model output 122, and the second model output 126. The optimization function associated with the quantum compute device can be the QUBO formulation. For instance, the optimization function 116 can be or include an Ising Hamiltonian function. The quantum compute device can be mapped, converted to, and/or expressed as a QUBO formulation to attempt to find binary variables that minimize an energy state of the second model 114. In other words, the optimization formulation associated with the quantum compute device is used to solve optimization problems of the second model 114 and/or the DBN-RBMs using quantum computing techniques (e.g., quantum annealing or reverse quantum annealing) to achieve faster and/or more efficient optimizations compared to classical computing methods. In some implementations, the optimization function 112 of the first model 110 can be the same as the optimization function 116 of the second model 114.

The memory 103 can store instructions to cause the processor 102 to update, based on the second sampled values 127 and the weights 115 to train the second model 114 to produce a trained second model 114. After training, the second model 114 can be the trained second model. The memory 103 can store instructions to cause the processor 102 to execute the second model 114 to generate an updated representation of the input of the second model 114. In other words, second model 114 can be trained to learn a probability distribution over the first model output 122 (e.g., visible units of the second model 114) by adjusting the weights and/or biases between the visible and hidden units. Additionally, the second model 114 can be trained to maximize the likelihood of that the hidden units of the second model 114 can be accurately activated from the visible units of the second model 114 (e.g., first model output 122) as well as the visible units of the first model 110 (e.g., input data 106). In some implementations, the memory 103 can store instructions to cause the processor 102 to update the weights 115 of the second model 114 for a predetermined amount of iterations. In some cases, the memory 103 can store instructions to cause the processor 102 to train the second model 110 for the predetermined amount of iterations.

For instance, the memory 103 can store instructions to cause the processor 102 to train the first model using training data that includes unlabeled data. The unlabeled data can include data that corresponds to a vector of values for the visible units of the second model 114. The second model 114 can be trained to learn a compressed representation of the input data 106. During training of the second model 114, the second model 114 can learn weights of connections between the visible units and the hidden units that best capture the training data. In some implementations, training the second model 114 can include adjusting the weights 115 (and biases) of the second model 114 to minimize the optimization function 116 (e.g., cost function) that measures a difference between the first model output 122 and the reconstruction of the first model output 122 produced by the second model 114.

The second model 114 can include a set of model parameters such as weights, biases, or activation functions that can be executed to annotate and/or classify the input for the second model 114 (e.g., first model output 122). The second model 114 can be executed during a training phase and/or an execution phase. In the training phase, the second model 114 receives training data and optimizes (or improves) parameters of the second model 114. The parameters of the second model 114 can be optimized (or improved) such that unlabeled input data in the training data for the second model 114 can be annotated and/or classified correctly with a certain likelihood of correctness (e.g., a pre-set likelihood of correctness). In some instances, the training data for the second model 114 can be divided into batches of data (e.g., epochs) based on a memory size, a memory type, a processor type, and/or the like. In some instances, the input data for the second model 114 can be divided into batches of data based on a type of the processor 102 (e.g., CPU, GPU, and/or the like), number of cores of the processor 102, and/or other characteristic of the memory 103 or the processor 102.

In some instances, the training data for the second model 114 can be divided into a training set, a test set, and/or a validation set. For example, the training data can be randomly divided so that 60% of the training data is in the training set, 20% of the training data is in the test set, and 20% of the training data is in the validation set. The second model 114 can be iteratively optimized (or improved) based on the training set while being tested on the test set to avoid overfitting and/or underfitting of the training set. Once the second model 114 is trained based on the training set and the test set, a performance of the second model 114 can be further verified based on the validation set.

In the execution phase of the second model 114, the second model 114 (that was trained in the training phase) receives outputs from the first model 110 (outputs not used in the training phase (e.g., first model output 122) and annotates and/or classifies the outputs of the first model 110 to learn parameters of the second model 114 (e.g., weights 115, biases, etc.). Because the execution phase of the second model 114 is performed using the parameters of the second model 114 that were already optimized during the training phase, the execution phase of the second model 114 can be computationally quick.

The memory 103 can store instructions to cause the processor 102 to generate, via the regression layer 118, output data 130 based on the second model output 126 from the second model 114. The regression layer 118 can be configured to map learned features to a continuous output value. In some implementations, the regression layer 118 can be associated with the DBN or be separate from the DBN such that the regression layer receives the output from the DBN (e.g., output from the second model 114) to generate output data. In some instances, the regression layer 118 can be configured to predict a continuous output value based on the input of the regression layer 118.

In some implementations, the memory 103 can store instructions to cause the processor 102 to train the regression layer 118 using training data in a supervised learning environment. In other words, the regression layer 118 can be a layer in the DBN applied after the last RBM (e.g., the second model 114). In other words, the regression layer 118 can be considered as an output layer of the first model 110 and the second model 114. The training data for training the regression layer 118 can be or include, for example, pairs of inputs (e.g., outputs of the first model 110 and/or the second model 114) and outputs of the regression layer 118, the outputs corresponding to target values. In some implementations, during training of the regression layer 118, the weights 119 of the regression layer (and biases of the regression layer) can be adjusted using an optimization function similar to the optimization functions 112, 116 (e.g., stochastic gradient descent), to minimize a difference between the output data 130 (e.g., predicted data) and a true output for each input in the training data. In other words, during training, the regression layer 118 can be trained end-to-end using backpropagation to minimize a prediction error and learn an optimal set of weights that map the input of the regression layer to the output of the regression layer.

The regression layer 118 can include a set of model parameters such as weights (e.g., weights 119) or biases that can be executed to annotate and/or classify the input for the regression layer 118 (e.g., second model output 126). The regression layer 118 can be executed during a training phase and/or an execution phase. In the training phase, the regression layer 118 receives training data and optimizes (or improves) parameters of the regression layer 118. The parameters of the regression layer 118 can be optimized (or improved) such that the training data for the regression layer 118 can be annotated and/or classified correctly with a certain likelihood of correctness (e.g., a pre-set likelihood of correctness). The training data for training the regression layer 118 can include activations of hidden units of the second model 110 correlated to target values (e.g., predicted outputs of time-series forecasting problems indicated by input data of the DBN-RBMs). In other words, the regression layer 118 can be trained to learn to map learned hidden layer representations from RBMs to output values.

In some instances, the training data for the regression layer 118 can be divided into batches of data (e.g., epochs) based on a memory size, a memory type, a processor type, and/or the like. In some instances, the input data for the regression layer 118 can be divided into batches of data based on a type of the processor 102 (e.g., CPU, GPU, and/or the like), number of cores of the processor 102, and/or other characteristic of the memory 103 or the processor 102.

In some instances, the training data for the regression layer 118 can be divided into a training set, a test set, and/or a validation set. For example, the training data can be randomly divided so that 60% of the training data is in the training set, 20% of the training data is in the test set, and 20% of the training data is in the validation set. The regression layer 118 can be iteratively optimized (or improved) based on the training set while being tested on the test set to avoid overfitting and/or underfitting of the training set. Once the regression layer 118 is trained based on the training set and the test set, a performance of the regression layer 118 can be further verified based on the validation set.

In the execution phase of the regression layer 118, the regression layer 118 (that is trained in the training phase) receives outputs from the second model 114 (outputs not used in the training phase (e.g., second model output 126) and annotates and/or classifies the outputs of the second model 114 to learn parameters of the regression layer 118 (e.g., weights 118, biases, etc.). Because the execution phase of the regression layer 118 is performed using the parameters of the regression layer 118 that were already optimized during the training phase, the execution phase of the regression layer 118 can be computationally quick.

In some implementations, the memory 103 can store instructions to cause the processor 102 to repeat the steps of generating the first model output 122, receiving the first sampled values 123, updating the weights 111 of the first model 110, generating the second model output 126, receiving the second sampled values 127, updating the weights 115 of the second model 114, generating the output data 130, is performed iteratively until an error value associated with the DBN-RBMs is below a predetermined threshold. The error value can be a mean square error (MSE). In some implementations, the error value can be a numerical value and/or percentage.

In some implementations, the memory 103 can store instructions to cause the processor 102 to generate a compound visualization based on the output data 130 and present the compound visualization on a graphical user interface (GUI) of a remote compute device (not shown in FIG. 1) operated by a user. The compound visualization can be or include, for example, a report describing the predictions of the DBN-RBNs. In some implementations, the compound visualization can present a time-series plot that includes a plot of actual results versus predicted values (e.g., output data 130) over time to visualize accuracy of the predictions from the DBN-RBMs. In some cases, the time-series plot can also include confidence intervals or prediction intervals to indicate uncertainty in the output data 130. In some implementations, the compound visualization can also include various performance metrics such as mean absolute error (MAE), mean squared error (MSE), root mean squared error (RMSE), mean absolute percentage error (MAPE), and/or the like, to present an evaluation of the accuracy of the predictions of the DBN-RBMs.

In some implementations, the compound visualization can also include forecast tables to present the output data 130 including forecasted values for a specific time horizon. The table can include actual values, predicted values, the prediction intervals, and/or the like. In some implementations, the compound visualization can also include analysis of insights into trends and/or seasonality of factors relevant to the predictions.

Figure 2:
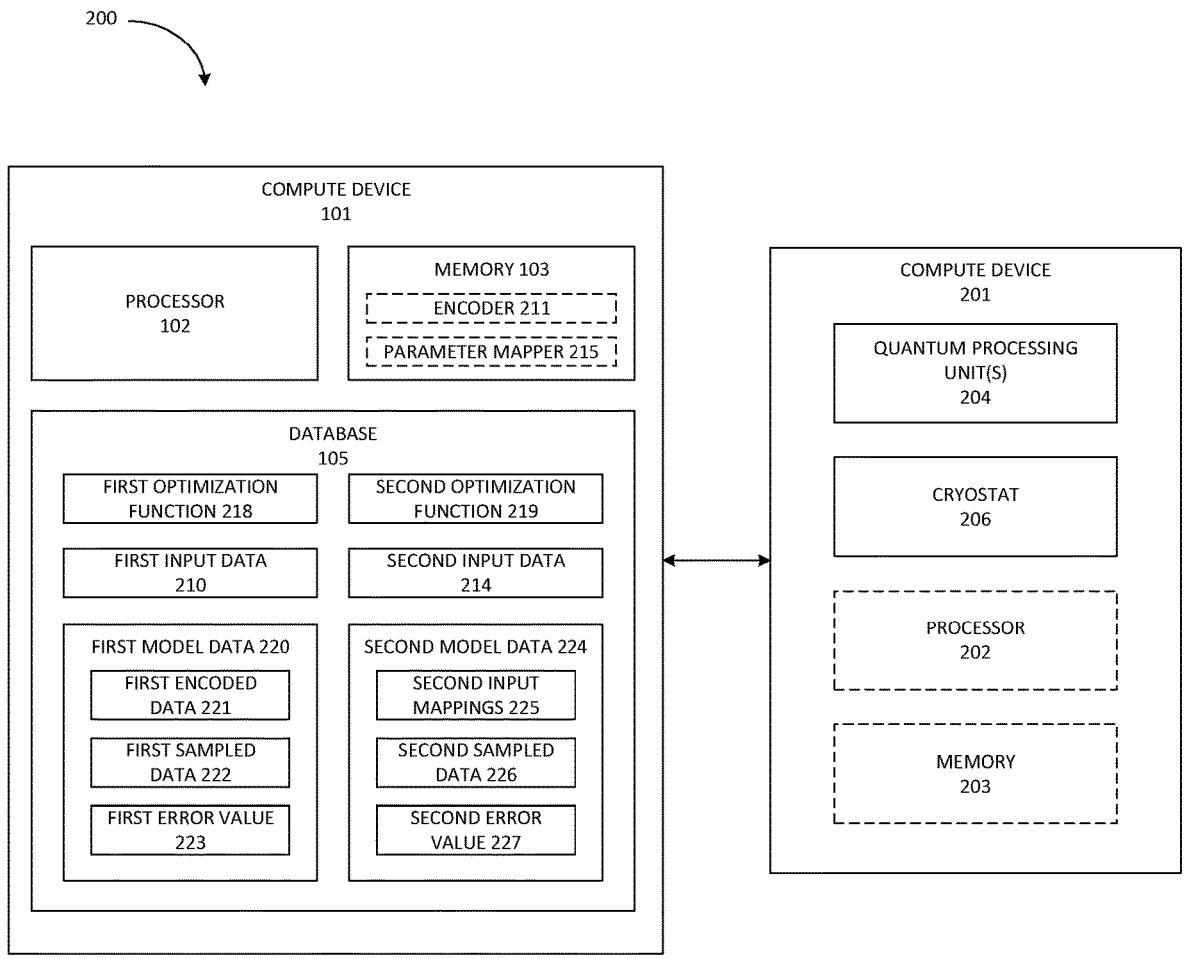
FIG. 2 is an illustration of a system including a quantum compute device with quantum annealing to optimize machine learning models of a classical computer for time-series forecasting, according to one or more embodiments.

FIG. 2 is an illustration of a system 200 including a quantum compute device 201 with quantum annealing to optimize machine learning models (e.g., deep learning models) of a classical computer for time-series forecasting using quantum computing, according to one or more embodiments. The system 200 can include a compute device 201 such as, for example, a quantum compute device, and a classical compute device (e.g., compute device 101 of FIG. 1). In some implementations, the compute device 101 in FIG. 2 can be consistent with the compute device 101 in FIG. 1. In some implementations, the compute device 201 can be structurally similar to the compute device 101 (classical compute device) of FIG. 1 but including quantum computing components. For instance, the compute device 201 can also be referred to herein as "quantum compute device." The compute device 201 can include, for example, a quantum processing unit(s) (QPU(s)) 204 and a cryostat 206. In some implementations, In some implementations, the compute device 201 can be a D-Wave quantum Computer®. The QPU(s) 204 can be responsible for performing quantum annealing used to solve optimization functions. In other words, the QPU(s) 204 can perform superposition and entanglement to perform computational tasks more efficiently than the processor of a classical compute device (e.g., processor 102 of compute device 101 of FIG. 1). The QPU(s) 204 can be maintained at a temperature near absolute zero and/or isolated from environmental hazards.

In some implementations, the QPU(s) 204 can be or include a lattice of metal loops, each of which is a qubit or a coupler. In some cases, below temperatures of 9.2 kelvin, the metal loops can become superconductors and exhibit quantum-mechanical effects. In some implementations, the QPU(s) 204 can also include a lattice of interconnected qubits in various topologies such as, for example, Chimera®, Pegasus®, Zephyr®, and/or the like. In some implementations, the QPU(s) of the compute device 201 can include 5,000 qubits and 35,000 couplers. The QPU(s) 204 can be prepared to operate at certain temperatures and/or in a low-magnetic field environment.

In some implementations, the cryostat 206 can be a device used to maintain low temperatures and/or extremely low temperatures of the QPU(s) 294 and/o the compute device 201. For instance, the cryostat 206 can be a refrigeration system designed to reach and maintain temperatures close to absolute zero (e.g., (−273.15 degrees Celsius or −459.67 degrees fahrenheit). The cryostat 206 can be used to keep qubits of the compute device 202 at low temperatures to operate (e.g., in a range of 0.001 millikelvin). The cryostat 206 can be used to cool the qubits and other components of the cd 201 to reduce thermal noise and maintain quantum states of the qubits. This is so, at least in part, to enable qubits to perform quantum operations. The QPU(s) 204 and the cryostat 206 can be controlled and/or operated by the processor 102 of the compute device 101 (or an operator of the compute device 101).

Alternatively or additionally, the compute device 201 can include, for example, an optional processor 202 and an optional memory 203 that communicate with each other, and with other components, via a bus (not shown in FIG. 2). The bus can include any of several types of bus structures such as, for example, a memory bus, a memory controller, a peripheral bus, a local bus, and/or the like, using any of a variety of bus architectures. The compute device 201 can be or include, for example, a computer workstation, a terminal computer, a server computer, a handheld device (e.g., a tablet computer, a smartphone, etc.), and/or any machine capable of executing a sequence of instructions that specify an action to be taken by that machine, and any combinations thereof. The compute device 201 can also include multiple compute devices that can be used to implement a specially configured set of instructions for causing one or more of the compute devices to perform any one or more of the aspects and/or methodologies described herein.

The processor 202 can be or include, for example, a hardware based integrated circuit (IC), or any other suitable processing device configured to run and/or execute a set of instructions or code. For example, the processor 202 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 202 can be configured to run any of the methods and/or portions of methods discussed herein.

The memory 203 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 202 to perform one or more processes, functions, and/or the like. In some implementations, the memory 203 can include extendable storage units that can be added and used incrementally. In some implementations, the memory 203 can be a portable memory (e.g., a flash drive, a portable hard disk, and/or the like) that can be operatively coupled to the processor 202. In some instances, the memory 203 can be remotely operatively coupled with a separate compute device (not shown in FIG. 2). The memory 203 can include various components (e.g., machine-readable media) including, but not limited to, a random-access memory component, a read only component, and any combinations thereof. In one example, a basic input/output system (BIOS), including basic routines that help to transfer information between components within the compute system 201, such as during start-up, can be stored in memory 203. The memory 203 can further include any number of program modules including, for example, an operating system, one or more application programs, other program modules, program data, and any combinations thereof.

In some implementations, the compute device 201 can include an I/O interfaces (not shown in FIG. 2). The I/O interfaces of the compute device 201 can be or include hardware and software components that allow other compute devices and other electronic devices to communicate with the compute device 201 by sending and receiving data. In some implementations, the compute device 201 can also include a network interface (not shown in FIG. 2) and can be used for connecting the compute device 201 to one or more of a variety of networks (not shown in FIG. 2) and one or more remote devices connected thereto (e.g., compute device 101). In some instances, the compute device 201 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted or unencrypted. In some instances, the network can include multiple networks or subnetworks operatively coupled to one another by, for example, network bridges, routers, switches, gateways and/or the like.

The QPU(s) 204 can be configured to process data from the compute device 101 and generate data to be stored in the database 105 of the compute device 101. For instance, the database 105 of the compute device 101 can include a first optimization function 218, a second optimization function 219, first input data 210, second input data 214, first model data 220, second model data 224, and/or the like. In some implementations, the first optimization function 218 can be an optimization function associated with the compute device 101 such as, for example, energy function, cost function, loss function, log-likelihood gradient, log-likelihood partial derivative, Ising Hamiltonian, and/or the like. The second optimization function 219 can be an optimization function compatible with the compute device 201. In other words, the second optimization function 219 can be optimization function that is compatible with quantum computing (e.g., QUBO formulation).

In some implementations, the memory 103 of compute device 101 can include an optional encoder 211 and an optional parameter mapper 215. The encoder 211 can be a software/hardware component configured to encode data (e.g., first input data 210, second input data 214, etc.). For instance, the encoder 211 can encode numerical data to binary data to be used for optimization functions (e.g., second optimization function 219) that uses binary data. In some cases, the encoder 211 can use a binary-decimal block diagonal conversion matrix to convert binary data to numerical data or numerical data to binary data. This is so, at least in part, to select variables for the second optimization function 219 (e.g., QUBO formulation) to accommodate for size of the size and/or capacity of the compute device 201. The second optimization function 219 (e.g., QUBO formulation) can be optimized via quantum annealing. The parameter mapper 215 can be configured to map binary values to parameters and/or coefficients of the second optimization function (e.g., QUBO formulation). The first input data 210 can include the input data 106 from FIG. 1 and can include, for example, historical data associated with, sales, weather, market, financial, and/or the like. For instance, the input data 206 can include a collection of data describing SKUs (e.g., number of SKUs sold over a period of time), closing prices of stocks, economic indicators, temperature measurements and patterns, daily energy consumption and usage rates, internet traffic, and/or the like. Alternatively or additionally, the memory 203 of the compute device 201 can include the encoder 211 and configured to encode data (e.g., first input data 210, second input data 214, etc.) at the compute device 201 instead of the compute device 101. Alternatively or additionally, the memory 203 of the compute device 201 can include the parameter mapper 215 and configured to map binary values to parameters and/or coefficients of the second optimization function (e.g., QUBO formulation) at the compute device 201 instead of the compute device 101.

In some implementations, the first model data 220 can include data associated with the first model 110 from FIG. 1 such as, for example, first encoded data 221, first sampled data 222, first error value 223, and/or the like. The first encoded data 221 can be or include a binary encoding of numerical data such as, for example, first input data 210. The first input data 210 can include a subset of weights of the DBN-RBMs of the compute device 101 (e.g., weights 111 of the first model 110). The first input data 210 can also include visible units of the first model 110 (e.g., input data 106 from FIG. 1) and/or hidden units of the first model 110 (e.g., first model output 122). The first input data 210 can be data used to generate first sampled data 222 using the second optimization function 219 (e.g., QUBO formulation) that was converted from the first optimization function 218 (e.g., Ising Hamiltonian formulation). The first sampled data 222 can be consistent with the first sample values 123 from FIG. 1. The first sampled data 222 can include updated values for parameters of the first model 110 from FIG. 1 (e.g., weights, biases, activation functions, etc.). The first error value 223 can be an error value associated with the second optimization function 219 (e.g., QUBO formulation) using the first input data 210.

The second model data 224 can include data associated with the second model 114 from FIG. 1 such as, for example, second input mappings 225, second sampled data 226, second error value 227, and/or the like. The second input mappings 225 can include mappings of second input data 214 to coefficients and/or parameters of the second optimization function 219. The second input data 214 can include data from the second model 114 from FIG. 1 (e.g., visible units (e.g., first model output 122), hidden units (e.g., second model output 126), weights 115, etc.). It is to be understood that in some implementations, the output of the first model 110, which is the first model output 122, can be represented as binary values (e.g., first encoded data 221). Since the output of the first model 110 is used as an input of the second model 114, i.e., the input is already in binary (e.g., first encoded data 221), the compute device 201 does not need to encode that input again to binary values to be used in by the second optimization function 219 (e.g., QUBO formulation). The second sampled data 226 can be consistent with the second sampled values 127 from FIG. 1. The second sampled data 226 can include updated values for parameters of the second model 114 from FIG. 1 (e.g., weights, biases, activation functions, etc.). The second error value 227 can be an error value associated with the second optimization function 219 (e.g., QUBO formulation) using the second input data 210.

In some implementations, the databased 105 of the compute device 101 can store at least the first input data 210 from the first model 110, the second input data 214 from the second model 114 of FIG. 1, and/or the like. In some implementations, weights 111 of the first model 110 from FIG. 1 can be adjusted such that the first model 110 can capture complex relationships between the visible units and the hidden units and make more accurate predictions. In some implementations, the second model 114 can include weights 115 from FIG. 1 used to minimize an optimization function associated with the second model 114. The optimization of the second model 114 of FIG. 1 can be the same as the optimization function of the first model 110 of FIG. 1. The optimization function of the first model 110 and the second model 114 can be the same as the first optimization function 218 (e.g., energy function, Ising Hamiltonian, etc.).

In some implementations, the memory 203 of the compute device 201 can store instructions to cause the processor 202 (or QPU(s) 204) to receive, from the compute device 101 from FIG. 1 (e.g., classical compute device), the first input data 210. The first input data 210 can include, for example, data from the first model 110. In some implementations, the first input data 210 can include a first subset of weights (e.g., weights 111 for the first model 110) from a set of weights associated with the DBN-RBMs of the compute device 101.

In some implementations, the memory 103 can store instructions to cause the processor 102 of the compute device 101 to transmit the first input data 210 to the QPU(s) 204 of the compute device 201.

In some implementations, the memory 203 of the compute device 201 can store instructions to cause the processor 202 (or QPU(s) 204) to convert, based the first input data 210, the first optimization function 218 (e.g., Ising Hamiltonian formulation) associated with the first model 110 to the second optimization function 219 (e.g., QUBO formulation). In some implementations, the second model 114 can also include an optimization function equal to the first optimization function 218 (e.g., Ising Hamiltonian formulation). This is so, at least in part, to generate values to adjust parameters of the first model 110 using quantum computing techniques.

In some implementations, the memory 103 of the compute device 101 can store instructions to cause the processor 102 to convert, based the first input data 210, the first optimization function 218 (e.g., Ising Hamiltonian formulation) associated with the first model 110 to the second optimization function 219 (e.g., QUBO formulation) at the compute device 101 and transmit the second optimization function 219 to the QPU(s) 204 of the compute device 201.

In some implementations, the memory 203 of the compute device 201 can store instructions to cause the processor 202 (or QPU(s) 204) to encode the first input data 210 to generate the first encoded data 221. In some implementations, the first encoded data 221 can be generated via the encoder 211. The memory 203 can store instructions to cause the QPU(s) 204 to generate, using the second optimization function 219 (e.g., QUBO formulation), the first sampled data 222 based on the weights 111 of the first model 110 and the first encoded data 221. The first sampled data 222 can be used to update parameters of the first model 110 such as, for example, an optimization function of the first model 110 (e.g., first optimization function 218). In some implementations, the parameters with adjusted values (e.g., weights, biases, etc.) can be used to reduce a first error value associated with the first model 110 (e.g., first error value 223).

In some implementations, the QPU(s) 204 can be used to perform quantum computing. In some implementations, the encoder 211 can be included in the classical compute device (e.g., compute device 101) such that the processor 102 of the compute device 101 can convert the first optimization function 218 to the second optimization function 219.

In some implementations, the memory 203 of the compute device 201 can store instructions to cause the processor 202 (or QPU(s) 204) to receive, from the compute device 101 from FIG. 1, the second input data 214 of the second model 114 of FIG. 1. The processor 202 (or QPU(s) 204) can also receive a subset of weights associated with the second model (e.g., weights 115 for the second model 110 from FIG. 1). In some implementations, the second input data 214 can include the weights 115 and other data associated with the second model (e.g., biases, activation indicators, etc.). The second input data 214 can include binary data. For instance, the second input data 214 can include an output of the first model 110.

In some implementations, the memory 103 of the compute device 101 can store instructions to cause the processor 102 to transmit the second input data 214 of the second model 114 of FIG. to the processor 202 (or QPU(s) 204) of the compute device 201.

In some implementations, the memory 203 of the compute device 201 can store instructions to cause the processor 202 (or QPU(s) 204) to map the second input data 214 to parameters of the second optimization function 219 (e.g., QUBO formulation) to produce a set of second input mappings 225. The second input mappings 225 can be used as inputs for the second optimization function 219. In other words, the second input mappings 225 include values that are in a format compatible with the second optimization function 219 (QUBO formulation).

In some implementations, the memory 103 of the compute device 101 can store instructions to cause the processor 102 of the compute device 101 to map the second input data 214 to parameters of the second optimization function 219 (e.g., QUBO formulation) to produce the set of second input mappings 225 at the compute device 101 instead of at the compute device 201.

In some implementations, the memory 203 of the compute device 201 can store instructions to cause the QPU(s) 204 to generate, using the second optimization function 219, the second sampled data 226 based on the weights 115 of the second model 114 and the second input mappings 225. In some implementations, the second sampled data 226 can be used to update parameters of the first optimization function 218, which can be the optimization function associated with the second model 114. The parameters of the first optimization function 218 can be updated using the second sampled data 226, to reduce a second error value 227 associated with the second model 114 of FIG. 1. The second error value 227 can be configured to be less than the first error value 223.

Figure 3:
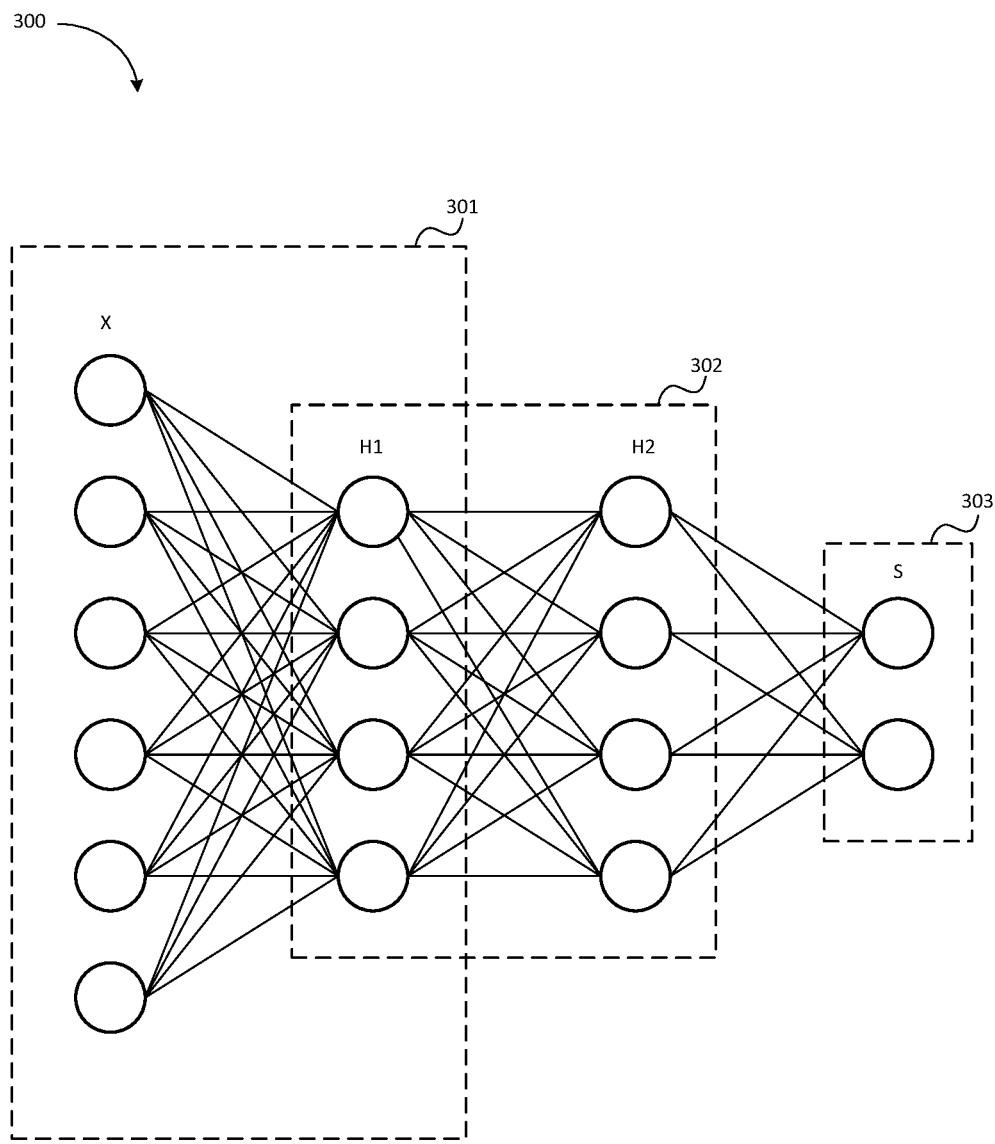
FIG. 3 is a schematic diagram of a Deep Belief Network for time-series forecasting, according to one or more embodiments.

FIG. 3 is a schematic diagram of a Deep Belief Network (DBN) 300 for time-series forecasting, according to one or more embodiments. The DBN 300 of FIG. 3 can be consistent with the DBN of FIG. 1. The DBN 300 can include multiple machine learning models and/or deep learning models. The deep learning models can include, for example RBMs. As shown in FIG. 3, the DBN 300 can include a first RBM 301, a second RBM 302, and/or a regression layer 303. Each of the first RBM 301 and the second RBM 302 can be consistent with any RBM as described in the entirety of this disclosure.

The first RBM 301 can receive input data (e.g., input data 106 from FIG. 1). The input data can be represented as visible nodes X. The first RBM 301 can include hidden units H1. In some instances, the hidden nodes H1 can be used to describe and/or represent latent variables of the first RBM 301. For instance, using financial data as the input data, the latent variables can represent, for example, relationship(s) between financial assets, performance of a financial asset, correlation(s) between asset prices, interest rate(s), macroeconomic indicators, etc., and/or the like. The first RBM 301 can include weights and biases used to define strength of connections between the visible units X and the hidden units H1 of the first RBM 301. The weights and biases can be configured to define a probability of a given visible node causing activation of a certain combination of hidden nodes. The weights and biases can also be used to calculate a probability of a given hidden node being activated given a certain combination of visible nodes. The first RBM 301 can be trained by adjusting the weights and biases to maximize a likelihood of the visible units X given the hidden units H1, and vice versa. In some implementations, the hidden units H1 of the first RBM 301 can be consistent with the representation of the input data 106 and/or the first model output 122 from FIG. 1. In some implementations, the visible units X can represent numerical data and the hidden units H1 can represent binary data.

The second RBM 302 can receive an output from the first RBM 301, such as, for example, the hidden units H1 such that the hidden units H1 are now the visible units of the second RBM 302. The second RBM 302 can include hidden units H2. The second RBM 302 can include weights and biases used to define strength of connections between the visible units H1 and the hidden units H2 of the second RBM 302. The weights and biases can be configured to define a probability of a given visible node causing activation of a certain combination of hidden nodes. The weights and biases can also be used to calculate a probability of a given hidden node being activated given a certain combination of visible nodes. The second RBM 302 can be trained by adjusting the weights and biases to maximize a likelihood of the visible units H1 given the hidden units H2, and vice versa. In some implementations, the hidden units H2 of the second RBM 302 can be consistent with the second model output 126 from FIG. 1.

The regression layer 303 can be configured to receive an output of the second RBM 302 such as the hidden units H2. The regression layer 303 can be configured to map the hidden units H2 to target values such as output data S. In other words, the regression layer 303 can map binary data of the hidden units H2 from the second RBM 302 to continuous data in the output data S. The output data S can represent predicted data. In some implementations, the regression layer 303 can include weights, biases, activation functions, and/or the like. In some implementations, the weights can be configured to connect the output of the second RBM 302 (e.g., hidden units H2) to the regression layer, and the bias is used to shift the activation function. In some implementations, the activation function can be used to map the hidden units H2 to the output data S.

Figure 4A:
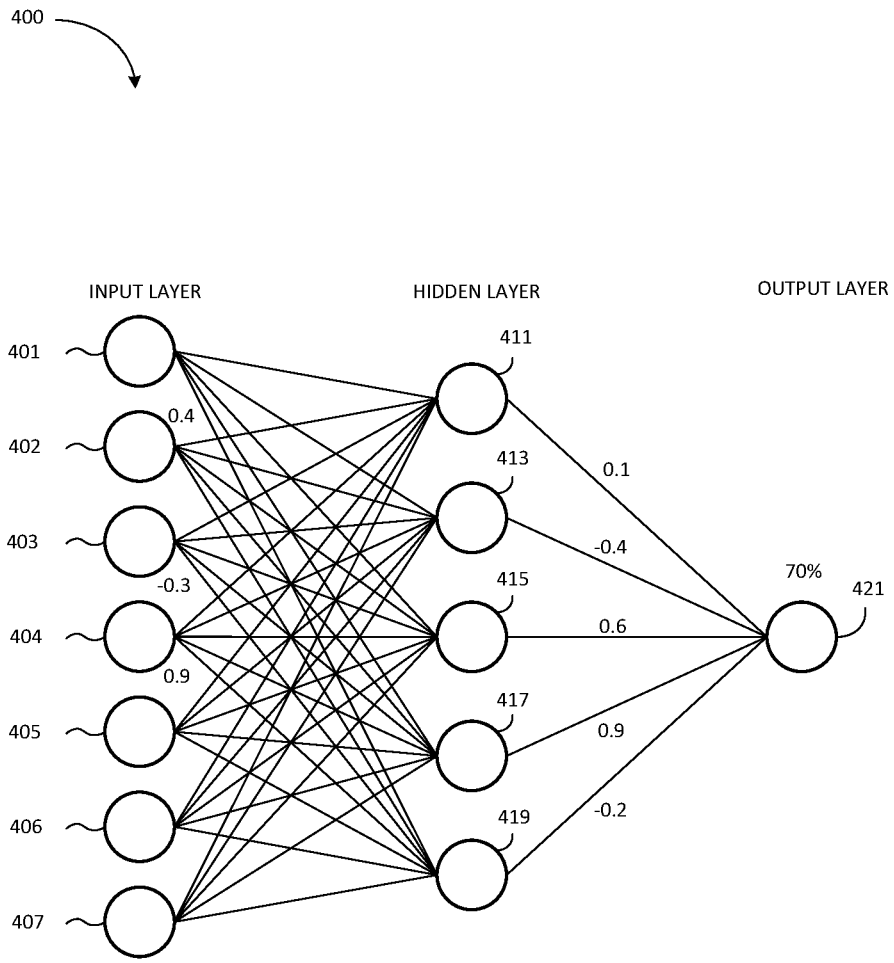
FIG. 4A-B is a schematic diagram of a neural network trained to improve time-series forecasting accuracy, according to one or more embodiments.
Figure 4B:
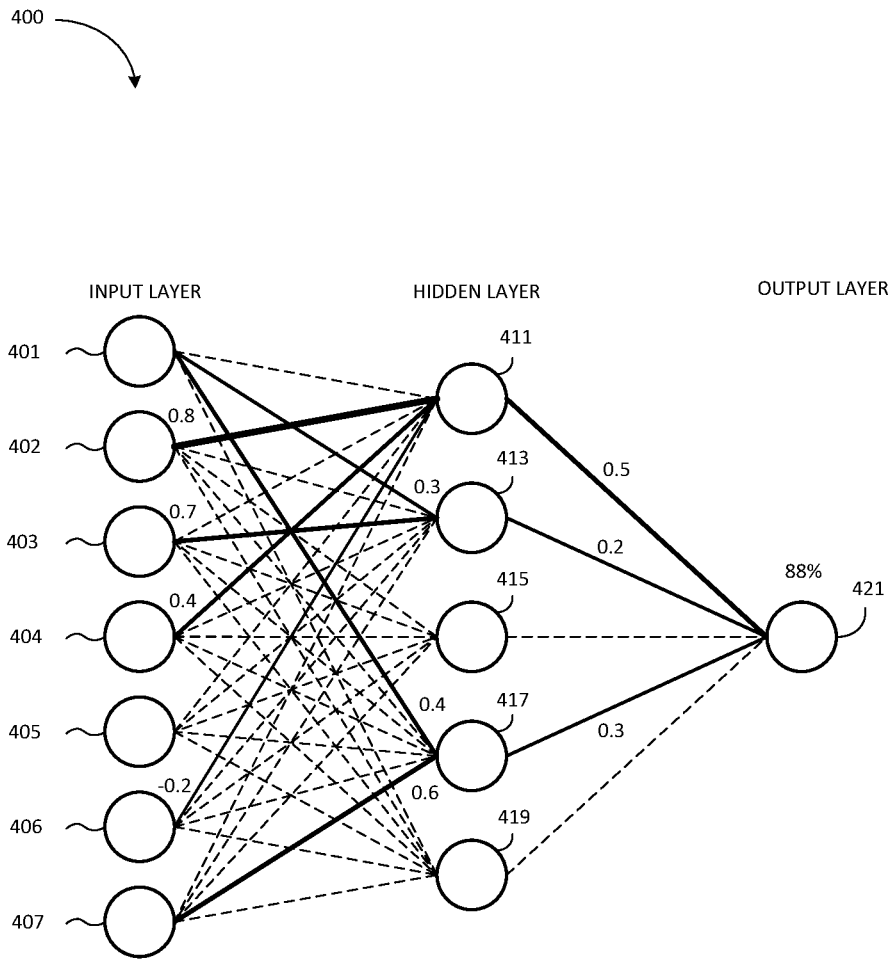

FIG. 4A-B is a schematic diagram of a neural network 400 trained to improve time-series forecasting accuracy, according to one or more embodiments. In FIG. 4A or FIG. 4B, the neural network 400 can be or include the DBN-RBMs from FIG. 1 or FIG. 3. As shown in FIG. 4A, the neural network 400 can include an input layer, a hidden layer, and an output layer. In some implementations, the input layer and the hidden layer can be components of an RBM as described in FIG. 1 or FIG. 3. The input layer can be include visible units 401, 402, 403, 404, 405, 406, and/or 407. Each of the visible units 401, 402, 403, 404, 405, 406, and/or 407 can be connected via weights to one or more of hidden units 411, 413, 415, 417, and/or 419 of the hidden layer. For example, visible unit 402 can be connected to hidden unit 413 with a weight of 0.4. In another example, visible unit 404 can be connected to hidden unit 411 with a weight of −0.3 and connected to hidden unit 419 with a weight of 0.9. Each of the hidden units 411, 413, 415, 417, and/or 419 can be mapped to an output value 421 of the output layer. In some implementations, the output layer can be consistent with the regression layer 118 from FIG. 1. The output value 421 can represent a predicted value. For instance, as show in FIG. 4A, the hidden unit 411 can be mapped to the output value 421 with a weight of 0.1, the hidden unit 413 can be mapped to the output value 421 with a weight of −0.4, the hidden unit 415 can be mapped to the output value 421 with a weight of 0.6, the hidden unit 417 can be mapped to the output value 421 with a weight of 0.9, and the hidden unit 419 can be mapped to the output value 421 with a weight of −0.2. The output value 421 can be associated with a level of accuracy of 70%.

As shown in FIG. 4B, the neural network 400 can be trained with adjusted weights to improve accuracy of the predicted value 421. After training, the neural network 400 can be adjusted with new weights, biases, activation functions, etc., provided by a quantum compute device (not shown in FIG. 4A or FIG. 4B). For instance, the quantum compute device can solve an optimization function of the neural network 400 using quantum computing techniques (e.g. quantum annealing) to find values to minimize an error associated with the optimization function. The quantum compute device can provide to the neural network 400 sampled values to be inputted into parameters of the neural network 400 (e.g., updated weights, biases, etc.).

For example, the visible unit 401 can be connected to the hidden unit 417 with an adjusted weight of 0.4 and connected to the hidden unit 413 with an adjusted weight of 0.3. The visible unit 402 can be connected to the hidden unit 411 with an adjusted weight of 0.8. The visible unit 403 can be connected to the hidden unit 413 with an adjusted weight of 0.7. The visible unit 404 can be connected to the hidden unit 411 with an adjusted weight of 0.4. The visible unit 406 can be connected to the hidden unit 411 with an adjusted weight of −0.2. The visible unit 407 can be connected to the hidden unit 417 with an adjust weight of 0.6.

The hidden unit 411 can be mapped to the output value 421 with an adjusted weight of 0.5. The hidden unit 413 can be mapped to the output value 421 with an adjusted weight of 0.2 The hidden unit 417 can be mapped to the output value 421 with an adjusted weight of 0.3. The adjusted weights and/or activation of hidden units and visible units can change the accuracy of the output value 421. For instance, the adjusted weights can cause the output value 421 to have an accuracy of 88%. It is important to note that the dashed lines between the input layer and the hidden layer shown in FIG. 4B represent unchanged weights and/or absent weights.

Figure 5:
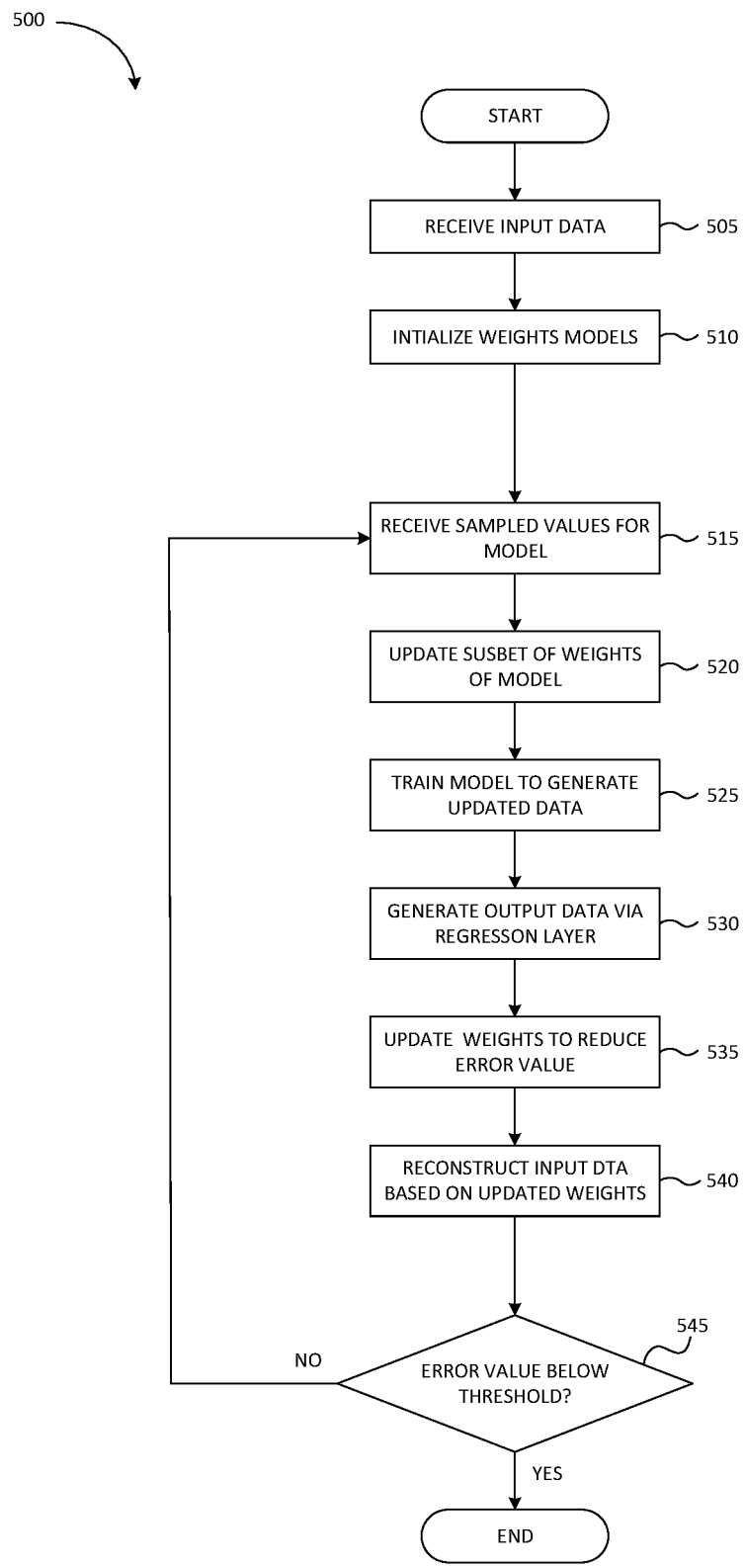
FIG. 5 is a method for time-series forecasting using a deep learning model, according to one or more embodiments.

FIG. 5 is a method 500 for time-series forecasting using a deep learning model, according to one or more embodiments. At 505, the method 500 can include receiving, at a processor of a compute device, input data for a Deep Belief Network (DBN). The input data can be consistent with the input data described in FIG. 1. The input data can include historical data associated with, for example, sales, weather, market, financial, and/or the like. For instance, the input data can include a collection of data describing SKUs (e.g., number of SKUs sold over a period of time), closing prices of stocks, economic indicators, temperature measurements and patterns, daily energy consumption and usage rates, internet traffic, and/or the like.

At 510, the method 500 can include initializing and/or randomly initializing, based on the input data, a set of weights for each machine learning model from a set of machine learning models associated with the DBN. In some implementations, each machine learning model can include a deep learning model such as, for example, an RBM. In some implementations, the method 500 can include initializing and/or randomly initializing other parameters of each deep learning model such as, for example, biases.

After 515, the method 500 can include iteratively performing a series of steps until an error value associated with the DBN-RBMs (e.g., MSE) is below a predetermined threshold. At 515, the method 500 can include receiving, from a quantum compute device using an optimization function (e.g., QUBO formulation) associated with the quantum compute device, a set of sampled values. The sampled values can be generated based on at least a subset of weights associated with a deep learning model from the set of deep learning model.

In some implementations, the method 500 can include, prior to receiving the set of sampled values from the quantum compute device, generating a set of gradients using an optimization function (e.g., log-likelihood gradient) and based on the input data. The set of gradients can be used to update the subset of weights for the deep learning model.

At 520, the method 500 can include updating, based on the sampled values, the subset of weights. In some implementations, the sampled values can include new values and/or updated values for parameters of the deep learning model such as, for example, the subset of weights, biases, and/or the like.

At 525, the method 500 can include training the deep learning model based on updated subset of weights, to produce a trained deep learning model. The trained deep learning model can be configured to generate an updated representation of the input data. In some implementations, the updated representation of the input data can be consistent with hidden units of the deep learning model.

At 530, the method 500 can include generating, via a regression layer associated with the DBN, output data based on the updated representation of the input data. The regression layer can be configured to map the updated representation of the input data (e.g., output of the deep learning model) to the output data (e.g., predicted data). The updated representation of the output data can be or include binary data. In some implementations, the method 500 can include mapping the representation of the input data to the output data in which the output data is a continuous value.

In some implementations, the method 500 can include iteratively performing, until the error value is below the predetermined threshold, generating, for the representation of the input data, a set of activation indicators based on the input data and the subset of weights for the deep learning model. The set of activation indicators can indicate an activation state for the representation of the input data with respect to the input data.

At 535, the method 500 can include iteratively updating, via backpropagation of the regression layer, a set of weights of the regression layer to reduce the error value. In some implementations, the method 500 can include iteratively updating the set of weights of the DBN-RBMs, including the subset of weights of the machine learning and the weights of the regression layer, to reduce the error value. In some implementations, the error value can be based on a difference between the first input data and the output data. In some implementations, the error value can be based on the output data, which can be predicted data, and an actual output. In some implementations, the method 500 can include iteratively updating the subset of weights of the deep learning model via backpropagation.

In some implementations, the method 500 can include iteratively updating for a predetermined amount of iterations. In some cases, the method 500 can include iteratively update until a predetermined threshold is reached.

At 540, the method 500 can include reconstructing, via the deep learning model, the representation of the input data based on the subset of weights updated by the regression layer, to produce a reconstructed representation of the input data. In some implementations, at 540, the method 500 can include executing the deep learning model generate the reconstructed representation of the input data.

At 545, the method 500 can include checking if the error value is below the predetermined threshold. If the error value is not below the predetermined threshold, the method 500 can include iteratively repeating steps 515, 520, 525, 530, 535, and/or 540 until the error value is below the predetermined threshold.

In some implementations, the method 500 can include repeating steps 515, 520, 525, 530, 535, and/or 540 using reverse annealing. This is so, at least in part, to quickly solve optimization problems using quantum computing power. In some implementations, repeating the steps can include initially setting the DBN-RBMs at a lowest energy state, and gradually increasing the temperature of the DBN-RBMs to attempt to find parameters to solve the optimization problems. In some cases, the repeating steps can end at a highest temperature of the DBN-RBMs, i.e., when optimal parameters are found.

Figure 6:
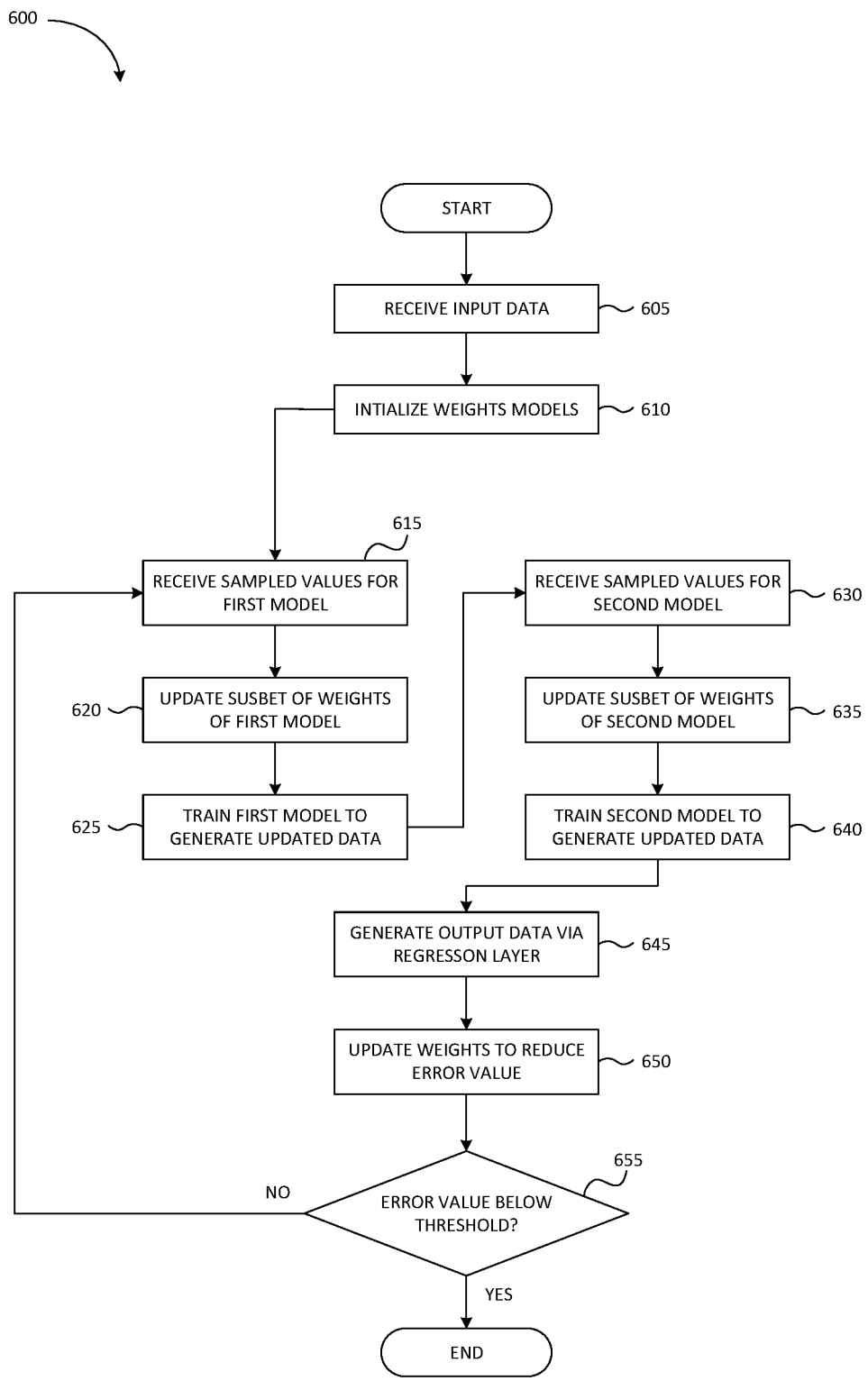
FIG. 6 is a method for time-series forecasting using multiple deep learning models, according to one or more embodiments.

FIG. 6 is a method 600 for time-series forecasting using multiple deep learning models, according to one or more embodiments. At 605, the method 600 can include receiving, at a processor of a compute device, input data for a Deep Belief Network (DBN). The input data can be consistent with the input data described in FIG. 1. The input data can include historical data associated with, for example, sales, weather, market, financial, and/or the like. For instance, the input data can include a collection of data describing SKUs (e.g., number of SKUs sold over a period of time), closing prices of stocks, economic indicators, temperature measurements and patterns, daily energy consumption and usage rates, internet traffic, and/or the like.

At 610, the method 600 can include initializing and/or randomly initializing, based on the input data, a set of weights for each machine learning model from a set of machine learning models associated with the DBN. In some implementations, each machine learning model can include a deep learning model such as, for example, an RBM. Each deep learning model can be consistent with any deep learning model as described in the entirety of this disclosure. In some implementations, the method 600 can include initializing and/or randomly initializing other parameters of each machine learning model such as, for example, biases. In some implementations, the method 600 can include initializing and/or randomly initializing weights for a first deep learning model and weights of a second deep learning model.

After 615, the method 600 can include iteratively performing a series of steps until an error value associated with the DBN-RBMs (e.g., MSE) is below a predetermined threshold. At 615, the method 600 can include receiving, from a quantum compute device using an optimization function (e.g., QUBO formulation) associated with the quantum compute device, a first set of sampled values. The first set of sampled values can be generated based on at least a subset of weights associated with the first deep learning model. In some implementations, the first set of sample values can be generated by the quantum compute device by mapping an optimization function of the first deep learning model to the QUBO formulation.

At 620, the method 600 can include updating, based on the first set of sampled values, the subset of weights of the first deep learning model. In some implementations, the first set of sampled values can include new values and/or updated values for parameters of the first deep learning g model such as, for example, the subset of weights, biases, and/or the like.

At 625, the method 600 can include training the first deep learning model based on updated subset of weights for the first deep learning model, to produce a first trained deep learning model. The first trained deep learning model can be configured to generate a first updated representation of the input data. In some implementations, the first updated representation of the input data can be consistent with hidden units of the first deep learning model. In some implementations, the first updated representation of the input data can be consistent with the first model output as described in FIG. 1.

At 630, the method 600 can include receiving, from the quantum compute device using an optimization function (e.g., QUBO formulation), a second set of sampled values for the second deep learning model. The second deep learning model can receive the representation of the input data and/or the updated representation of the input data as an input. The second set of sampled values can be generated based on at least a subset of weights associated with the second deep learning model. In some implementations, the second set of sample values can be generated by the quantum compute device by mapping an optimization function of the second deep learning model to the QUBO formulation. In some implementations, the optimization function of the second deep learning model can be the same as the optimization function of the first deep learning model.

At 635, the method 600 can include updating, based on the second set of sampled values, the subset of weights of the second deep learning model. In some implementations, the second set of sampled values can include new values and/or updated values for parameters of the second deep learning model such as, for example, the subset of weights, biases, and/or the like.

At 640, the method 600 can include training the second deep learning model based on updated subset of weights for the second deep learning model, to produce a second trained deep learning model. The second trained deep learning model can be configured to generate a second updated representation of the input data. In some implementations, the second updated representation of the input data can be consistent with the second model output as described in FIG. 1.

At 645, the method 600 can include generating, via a regression layer associated with the DBN, output data based on the second updated representation of the input data. The regression layer can be configured to map the second updated representation of the input data (e.g., output of the second deep learning model) to the output data (e.g., predicted data). The second updated representation of the output data can be or include binary data. In some implementations, the method 600 can include mapping the second representation of the input data to the output data in which the output data is a continuous value.

At 650, the method 600 can include iteratively updating, via backpropagation of the regression layer, a set of weights of the regression layer to reduce the error value. In some implementations, the error value can be based on a difference between the first input data and the output data. In some implementations, the method 600 can include iteratively updating weights of the DBN-RBMS, including the subset of weights of the first deep learning model and the subset of weights of the second deep learning model, to reduce the error value. In some implementations, the error value can be based on the output data, which can be predicted data, and an actual output. In some implementations, the method 600 can include iteratively updating for a predetermined amount of iterations. In some cases, the method 600 can include iteratively update until a predetermined threshold is reached.

At 655, the method 600 can include checking if the error value is below the predetermined threshold. If the error value is not below the predetermined threshold, the method 600 can include iteratively repeating steps 615, 620, 625, 630, 635, 640, 645, and/or 650 until the error value is below the predetermined threshold.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
a processor; and
a memory operatively coupled to the processor, the memory storing instructions to cause the processor to:
receive input data for a Deep Belief Network (DBN) that includes an indication of a time-series problem;
randomly initialize a plurality of weights and a first optimization function for a first deep learning model from a plurality of deep learning models associated with the DBN, the plurality of weights representing a strength between visible units representing the input data and hidden units of the first deep learning model;
generate, via the first deep learning model and using the input data and a subset of weights from the plurality of weights, a representation of the input data, the subset of weights, the input data, and the representation of the input data to be transmitted to a quantum compute device;
iteratively perform, until an error value associated with the DBN is below a predetermined threshold:
receive a plurality of sampled values from the quantum compute device using a second optimization function associated with the quantum compute device, the plurality of sampled values generated using the subset of weights, the input data, and the representation of the input data;
update, based on the plurality of sampled values, the subset of weights to train the first deep learning model to produce a trained deep learning model, the trained deep learning model configured to generate an updated representation of the input data;
generate, via a regression layer associated with the DBN, output data based on the updated representation of the input data;
iteratively update, via backpropagation of the regression layer, a set of weights of the regression layer to reduce the error value associated with the DBN; and
reconstruct, via the first deep learning model, the representation of the input data based on the set of weights updated by the regression layer, to produce a reconstructed representation of the input data.

2. The apparatus of claim 1, wherein:
the subset of weights is a first subset of weights, the representation of the input data is a first representation of the input data, the updated representation of the input data is a first updated representation of the input data, the plurality of sampled values are a first plurality of sampled values, and
the memory stores instructions to further cause the processor to:
using the first updated representation of the input data as an input, generate, via a second deep learning model from the plurality of deep learning models and based on a second subset of weights from the plurality of weights, a second representation of the input data, the second subset of weights, the first updated representation, and the second representation of the input data to be transmitted to the quantum compute device;
receive a second plurality of sampled values from the quantum compute device using the second optimization function, the second plurality of sampled values generated based on the second subset of weights, the first updated representation of the input data, and the second representation of the input data;
update, based on the second plurality of sampled values, the second subset of weights to train the second deep learning model to produce a second trained deep learning model, the second trained deep learning model configured to generate a second updated representation of the input data; and
generate, via the regression layer, the output data based on the second updated representation of the input data.

3. The apparatus of claim 1, wherein the memory stores instructions to further cause the processor to generate, for the representation of the input data, a plurality of activation indicators based on the input data and the subset of weights, the plurality of activation indicators indicating an activation state for the representation of the input data with respect to the input data.

4. The apparatus of claim 1, wherein the memory stores instructions to further cause the processor to:
generate, for the representation of the input data, a plurality of activation indicators based on the input data and the subset of weights; and
generate, using a third optimization function, a plurality of gradients based on the plurality of activation indicators, the plurality of gradients used to train the first deep learning model.

5. The apparatus of claim 1, wherein
prior to receiving the plurality of sampled values from the quantum compute device, the memory stores instructions to further cause the processor to generate a plurality of gradients using a third optimization function and based on the input data, the plurality of gradients used to update the subset of weights.

6. The apparatus of claim 1, wherein the second optimization function is a Quadratic Unconstrained Binary Optimization (QUBO) formulation.

7. The apparatus of claim 1, wherein the first deep learning model includes an unsupervised machine learning model.

8. The apparatus of claim 1, wherein the memory stores instructions to further cause the processor to:
generate a compound visualization based on the output data; and
present the compound visualization on a graphical user interface of a user compute device.

9. The apparatus of claim 1, wherein the instructions to cause the processor to update the subset of weights include instructions to cause the processor to update the subset of weights for a predetermined amount of iterations.

10. The apparatus of claim 1, wherein the first deep learning model is trained using training data that includes unlabeled data.

11. The apparatus of claim 1, wherein the instructions to iteratively perform generate, via the regression layer associated with the DBN, output data based on the updated representation of the input data includes instructions to:
divide, based on a number of cores of the processor, the updated representation of the input data into batches of data; and
provide the batches of data to the regression layer.

12. A non-transitory, processor-readable medium storing instructions that executed by a processor, cause the processor to:
receive input data for a Deep Belief Network (DBN) indicating a time-series problem;
randomly initialize a plurality of weights and at least one of a first optimization function or an activation function for each deep learning model from a plurality of deep learning models associated with the DBN, the plurality of weights representing a strength between visible units representing the input data and hidden units of each deep learning model from the plurality of deep learning models; and
iteratively perform, until an error value associated with the DBN is below a predetermined threshold:
receiving, from a quantum compute device using a second optimization function associated with the quantum compute device, a plurality of sampled values, the plurality of sampled values generated using at least a subset of weights from the plurality of weights and associated with a first deep learning model from the plurality of deep learning models;
updating, based on the plurality of sampled values, the subset of weights to generate an updated subset of weights;
training the first deep learning model based on the updated subset of weights, to produce a trained deep learning model, the trained deep learning model configured to generate an updated representation of the input data;
generating, via a regression layer associated with the DBN, output data based on the updated representation of the input data;
iteratively updating, via backpropagation of the regression layer, a set of weights of the regression layer to reduce the error value; and
reconstructing, via the deep learning model, a representation of the input data based on the set of weights updated by the regression layer, to produce a reconstructed representation of the input data.

13. The non-transitory, processor-readable medium of claim 12, wherein:
the trained deep learning model is a first trained deep learning model, the subset of weights is a first subset of weights, the representation of the input data is a first representation of the input data, the plurality of sampled values are a first plurality of sampled values, the reconstructed representation of the input data is a first reconstructed representation of the input data, and
the instructions to cause the processor to iteratively perform, until the error value is below the predetermined threshold, further include:
receiving, from the quantum compute device using the second optimization function, a second plurality of sampled values, the second plurality of sampled values generated based on at least a second subset of weights from the plurality of weights and the first reconstructed representation of the input data, the second subset of weights associated with a second deep learning model from the plurality of deep learning models;
updating, based on the second plurality of sampled values, the second subset of weights to generate an updated second subset of weights;
training the second deep learning model based on the updated second subset of weights, to produce a second trained deep learning model, the second trained deep learning model configured to generate a second updated representation of the input data;
generating, via the regression layer, the output data based on the second updated representation of the input data; and
iteratively updating, via backpropagation of the regression layer, a set of weights of the regression layer to reduce the error value.

14. The non-transitory, processor-readable medium of claim 12, wherein the iteratively performing further includes generating, for the representation of the input data, a plurality of activation indicators based on the input data and the subset of weights, the plurality of activation indicators indicating an activation state for the representation of the input data with respect to the input data.

15. The non-transitory, processor-readable medium of claim 12, wherein:
prior to receiving the plurality of sampled values from the quantum compute device, the processor is further caused to generate a plurality of gradients using a third optimization function and based on the input data, the plurality of gradients used to update the subset of weights.

16. A method, comprising:
receiving input data for a Deep Belief Network (DBN) that includes an indication of a time-series problem;
randomly initializing a plurality of weights and a first optimization function for a first deep learning model from a plurality of deep learning models associated with the DBN, the plurality of weights representing a strength between visible units and hidden units of the first deep learning model;
generating, via the first deep learning model and using the input data and a subset of weights from the plurality of weights, a representation of the input data, the subset of weights, the input data, and the representation of the input data to be transmitted to a quantum compute device; and
iteratively performing, until an error value associated with the DBN is below a predetermined threshold:
receiving a plurality of sampled values from the quantum compute device using a second optimization function associated with the quantum compute device, the plurality of sampled values generated using the subset of weights, the input data, and the representation of the input data;
updating, based on the plurality of sampled values, the subset of weights to train the first deep learning model to produce a trained deep learning model, the trained deep learning model configured to generate an updated representation of the input data;
generating, via a regression layer associated with the DBN, output data based on the updated representation of the input data;
iteratively updating, via backpropagation of the regression layer, a set of weights of the regression layer to reduce the error value associated with the DBN; and
reconstructing, via the first deep learning model, the representation of the input data based on the set of weights updated by the regression layer, to produce a reconstructed representation of the input data.

17. The method of claim 16, wherein the subset of weights is a first subset of weights, the representation of the input data is a first representation of the input data, the updated representation of the input data is a first updated representation of the input data, the plurality of sampled values are a first plurality of sampled values, the method further comprising:
using the first updated representation of the input data as an input, generating, via a second deep learning model from the plurality of deep learning models and based on a second subset of weights from the plurality of weights, a second representation of the input data, the second subset of weights, the first updated representation, and the second representation of the input data to be transmitted to the quantum compute device;
receiving a second plurality of sampled values from the quantum compute device using the second optimization function, the second plurality of sampled values generated based on the second subset of weights, the first updated representation of the input data, and the second representation of the input data;
updating, based on the second plurality of sampled values, the second subset of weights to train the second deep learning model to produce a second trained deep learning model, the second trained deep learning model configured to generate a second updated representation of the input data; and
generating, via the regression layer, the output data based on the second updated representation of the input data.

18. The method of claim 16, further comprising:
generating, for the representation of the input data, a plurality of activation indicators based on the input data and the subset of weights, the plurality of activation indicators indicating an activation state for the representation of the input data with respect to the input data.

19. The method of claim 16, further comprising:
generating, for the representation of the input data, a plurality of activation indicators based on the input data and the subset of weights; and
generating, using a third optimization function, a plurality of gradients based on the plurality of activation indicators, the plurality of gradients used to train the first deep learning model.

20. The method of claim 16, further comprising:
prior to receiving the plurality of sampled values from the quantum compute device, generating a plurality of gradients using a third optimization function and based on the input data, the plurality of gradients used to update the subset of weights.

* * * * *